(12) United States Patent
Kimura et al.

(10) Patent No.: US 9,280,725 B2
(45) Date of Patent: Mar. 8, 2016

(54) INFORMATION PROCESSING APPARATUS, INFORMATION PROCESSING METHOD, AND NON-TRANSITORY COMPUTER READABLE MEDIUM

(71) Applicant: FUJI XEROX CO., LTD., Minato-ku, Tokyo (JP)

(72) Inventors: Shunichi Kimura, Kanagawa (JP); Eiichi Tanaka, Kanagawa (JP); Takuya Sakurai, Kanagawa (JP); Motoyuki Takaai, Kanagawa (JP); Masatsugu Tonoike, Kanagawa (JP); Yohei Yamane, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 63 days.

(21) Appl. No.: 14/031,517

(22) Filed: Sep. 19, 2013

(65) Prior Publication Data

US 2014/0226904 A1    Aug. 14, 2014

(30) Foreign Application Priority Data

Feb. 14, 2013 (JP) ................. 2013-026808

(51) Int. Cl.
*G06K 9/62* (2006.01)
*G06K 9/72* (2006.01)
*G06K 9/34* (2006.01)

(52) U.S. Cl.
CPC . *G06K 9/72* (2013.01); *G06K 9/344* (2013.01)

(58) Field of Classification Search
CPC ... G06K 2209/01; G06K 9/6224; G06K 9/78; G06K 9/00442; G06K 9/6202; G06K 9/18; G06K 9/34

USPC ......................................................... 382/185
See application file for complete search history.

(56) References Cited

U.S. PATENT DOCUMENTS

| | | | | |
|---|---|---|---|---|
| 6,324,302 B1* | 11/2001 | Sugiura | ................. | G06K 9/346 382/173 |
| 6,519,363 B1* | 2/2003 | Su | ........................... | G06K 9/68 382/177 |
| 8,139,870 B2* | 3/2012 | Kato | ............................. | 382/229 |
| 2001/0037330 A1* | 11/2001 | Honma et al. | ......... | G06F 17/243 |
| 2002/0154817 A1 | 10/2002 | Katsuyama et al. | | |
| 2005/0232484 A1* | 10/2005 | Tagawa et al. | ................ | 382/173 |
| 2006/0194187 A1* | 8/2006 | Saito | ............................. | 434/353 |

(Continued)

FOREIGN PATENT DOCUMENTS

JP    61-175878 A    8/1986
JP    3-37782 A    2/1991

(Continued)

*Primary Examiner* — Stephen R Koziol
*Assistant Examiner* — Shaghayegh Azima
(74) *Attorney, Agent, or Firm* — Sughrue Mion, PLLC

(57) ABSTRACT

An information processing apparatus includes a network creating unit that creates a network in which respective characters of plural character recognition results are represented as nodes, and in which nodes of adjacent character images are connected with a link, a first determining unit that determines a first candidate boundary in the network, a second determining unit that determines a second candidate boundary different from the first candidate boundary in the network, and an extracting unit that extracts, as to-be-searched objects, plural candidate character strings from a set of candidate character strings each formed of nodes between the first candidate boundary and the second candidate boundary.

9 Claims, 24 Drawing Sheets

(56) References Cited

U.S. PATENT DOCUMENTS

| | | | |
|---|---|---|---|
| 2008/0187221 A1* | 8/2008 | Konno et al. | 382/175 |
| 2012/0033887 A1* | 2/2012 | Tanaka | 382/176 |
| 2012/0134591 A1* | 5/2012 | Kimura | G06K 9/342 382/185 |
| 2012/0213442 A1* | 8/2012 | Oda | G06K 9/6814 382/182 |
| 2013/0034302 A1* | 2/2013 | Sata | 382/182 |

FOREIGN PATENT DOCUMENTS

| | | |
|---|---|---|
| JP | 3-233789 A | 10/1991 |
| JP | 4-68481 A | 3/1992 |
| JP | 4-92992 A | 3/1992 |
| JP | 4-100189 A | 4/1992 |
| JP | 4-311283 A | 11/1992 |
| JP | 5-73718 A | 3/1993 |
| JP | 5-114047 A | 5/1993 |
| JP | 5-128308 A | 5/1993 |
| JP | 8-161432 A | 6/1996 |
| JP | 9-54814 A | 2/1997 |
| JP | 9-185681 A | 7/1997 |
| JP | 10-154207 A | 6/1998 |
| JP | 11-203406 A | 7/1999 |
| JP | 2000-90194 A | 3/2000 |
| JP | 2002-312365 A | 10/2002 |
| JP | 2006-343870 A | 12/2006 |
| JP | 2009-230671 A | 10/2009 |

* cited by examiner

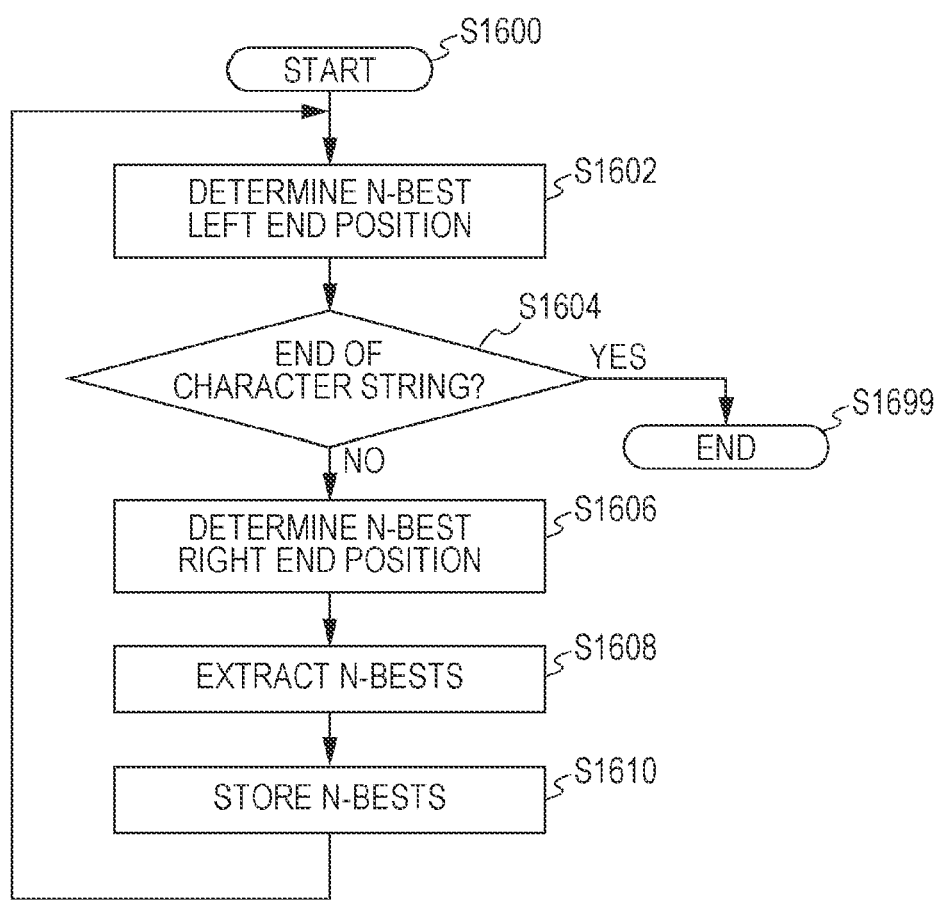

RECOGNITION RESULT
イヒ学の組織論

RECOGNITION RESULT
化学の
イヒ学の

RECOGNITION RESULT
ヒ学の
ヒ字の

PATTERN 1

PATTERN 2

PATTERN 3

PATTERN 4

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-026808 filed Feb. 14, 2013.

BACKGROUND

Technical Field

The present invention relates to an information processing apparatus, an information processing method, and a non-transitory computer readable medium.

SUMMARY

According to an aspect of the invention, there is provided an information processing apparatus that includes: a network creating unit that creates a network in which respective characters of plural character recognition results are represented as nodes, and in which nodes of adjacent character images are connected with a link; a first determining unit that determines a first candidate boundary in the network; a second determining unit that determines a second candidate boundary different from the first candidate boundary in the network; and an extracting unit that extracts, as to-be-searched objects, plural candidate character strings from a set of candidate character strings each formed of nodes between the first candidate boundary and the second candidate boundary.

BRIEF DESCRIPTION OF THE DRAWINGS

An exemplary embodiment of the present invention will be described in detail based on the following figures, wherein:

FIG. 16 is a flowchart illustrating an example of a process performed by a to-be-searched text generating module;

DETAILED DESCRIPTION

First, before describing an exemplary embodiment, the premise and an information processing apparatus using this exemplary embodiment will be described. This description is given to facilitate understanding of the exemplary embodiment.

Figure 30:
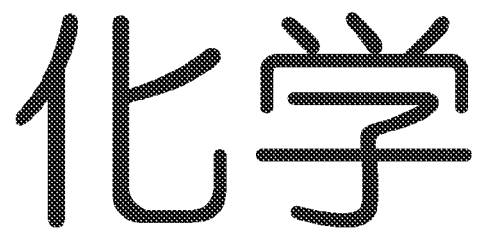
FIG. 30 is a diagram illustrating an example of a character string image.
Figure 31:
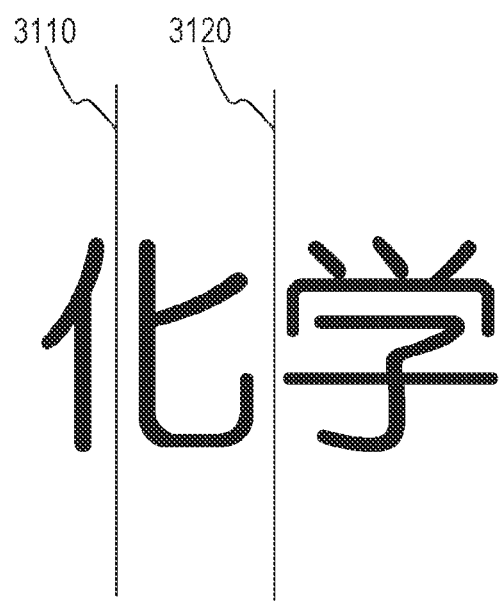
FIG. 31 is a diagram illustrating examples of candidate character boundary.

For example, a character string image as illustrated in FIG. 30 will be described. First, this character string image is divided into sub-characters (also referred to as character images and character segments). The sub-character is a character itself, or is one that may be a part of a character. Examples of character parts include a left-hand component and a right-hand component of a Chinese character. In the following, a horizontal character string image as illustrated in the example of FIG. 30 will be described. In the case of a horizontal character string image, the image is divided by vertical lines (or substantially vertical lines) so as to obtain sub-characters. For example, the character string image is divided by the vertical lines (candidate boundaries 3110 and 3120) illustrated in FIG. 31 so as to obtain three sub-characters "イ", "ヒ", and "学". The vertical lines illustrated in the example of FIG. 31 are referred to as candidate boundaries. The candidate boundary 3110 separates "イ" and "ヒ" from each other, and the candidate boundary 3120 separates "ヒ" and "学" from each other.

Figure 32:
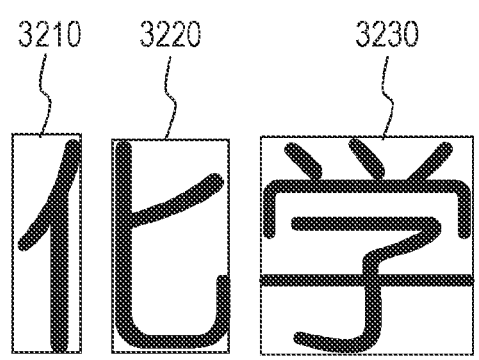
FIG. 32 is a diagram illustrating examples of circumscribed rectangles.

Next, as illustrated in the example of FIG. 32, circumscribed rectangles (circumscribed rectangles 3210, 3220, and 3230) of the respective sub-characters are extracted.

In the following, a description will be given with reference to known techniques.

The sub-characters are combined so as to determine a character image. In some cases, plural sub-characters are combined to form a single character. In other cases, a single sub-character forms a single character. Determining a character image is equivalent to determining a character segmentation position, and therefore may be hereinafter referred to as determining a character segmentation position.

There are plural patterns for combining sub-characters. A final character segmentation position is determined by selecting a pattern having the highest rating as a character image.

Figure 33A:
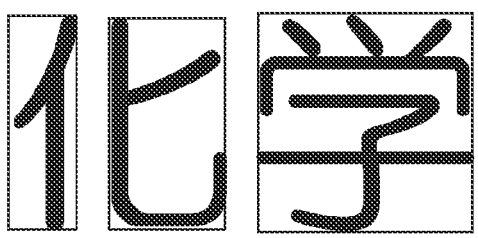
FIGS. 33A through 33D are diagram each illustrating an example of a character segmentation result.
Figure 33B:
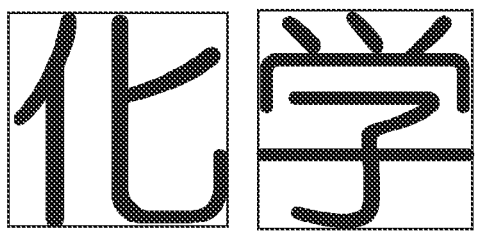
Figure 33C:
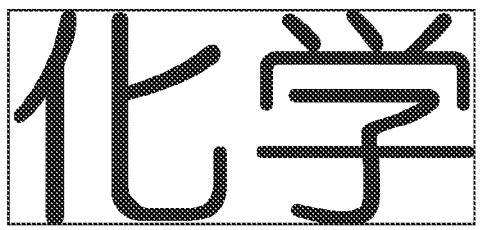
Figure 33D:
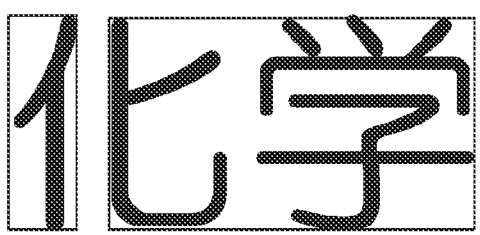

All the character segmentation patterns for the example of FIG. 32 are illustrated in the examples of FIGS. 33A through 33D. More specifically, the example of FIG. 33A illustrates three character images (the circumscribed rectangle 3210, the circumscribed rectangle 3220, and the circumscribed rectangle 3230) as a pattern 1. The example of FIG. 33B illustrates two character images (the circumscribed rectangles 3210 and 3220, and the circumscribed rectangle 3230) as a pattern 2. The example of FIG. 33C illustrates one character image (the circumscribed rectangles 3210, 3220, and 3230) as a pattern 3. The example of FIG. 33D illustrates two character images (the circumscribed rectangle 3210, and the circumscribed rectangles 3220 and 3230) as a pattern 4.

Figure 34:
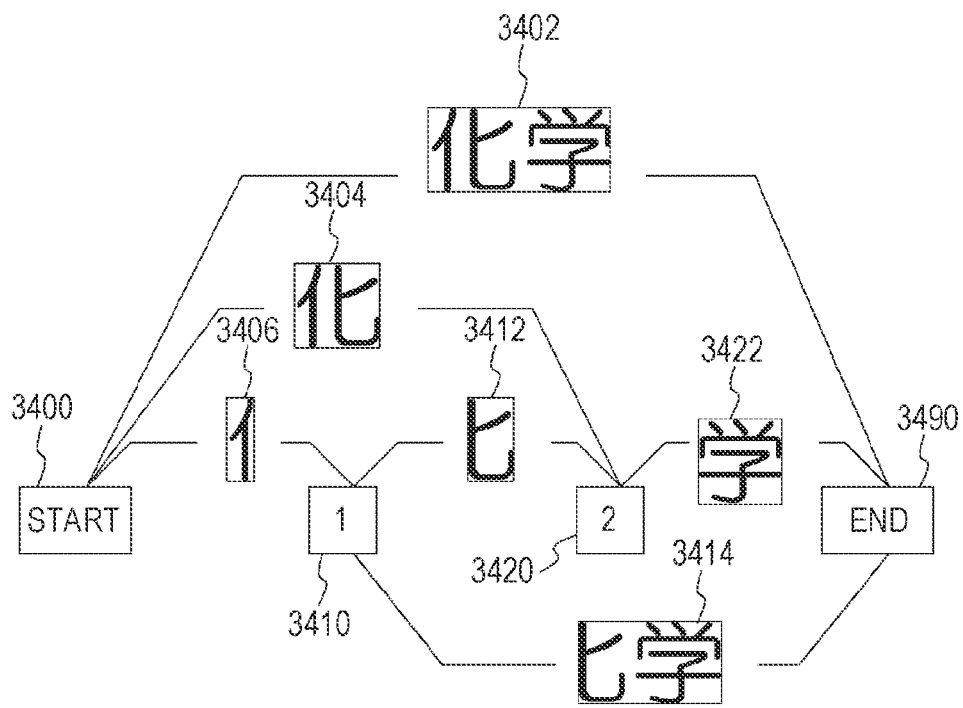
FIG. 34 is a diagram illustrating a network representation that represents character segmentation positions.

The plural segmentation patterns illustrated in the examples of FIGS. 33A through 33D may be expressed as a network representation (also referred to as a graph representation) that represents character segmentation positions. In the example of FIG. 34, a network includes four nodes, namely, a start node 3400, an end node 3490, an intermediate node 3410 (the node 1), and an intermediate node 3420 (the node 2), and arcs connecting the nodes (a connection line between nodes is referred to as an arc). The start point corresponds to the left end of the character string image, and the end point corresponds to the right end of the character string image. The intermediate nodes 3410 and 3420 (the nodes 1 and 2) indicate the respective candidate character boundaries (namely, the candidate boundaries 3110 and 3120 illustrated in the example of FIG. 31). The intermediate node 3410 (the node 1) corresponds to the candidate boundary 3110. The intermediate node 3420 (the node 2) corresponds to the candidate boundary 3120.

A route leading from a start point to an end node through the nodes is hereinafter referred to as a "path". A path includes one or more arcs. Generally, there are plural paths. The character segmentation patterns illustrated in the examples of FIGS. 33A through 33D correspond to these plural paths. For example, the pattern 2 in the example of FIG. 33B corresponds to a path (a character segmentation pattern 3404 and a character segmentation pattern 3422) indicated by the thick line of FIG. 35.

A single arc corresponds to a single candidate character image. For example, the arc connecting the start node 3400 and the intermediate node 3420 (the node 2) corresponds to a character image "化" (the character segmentation pattern 3404). An evaluation value may be determined for a character corresponding to a single arc. This value is referred to as an "arc evaluation value".

The arc evaluation value is calculated on the basis of character shape information, recognition accuracy in character recognition (confidence in that the sub-character subject to recognition is a character code obtained as the character recognition result), and the like. There are various methods of calculating the arc evaluation value.

A single path includes plural arcs. The evaluation value of the path including the plural arcs may be calculated on the basis of plural arc evaluation values. This evaluation value of the path is referred to as a "path evaluation value".

A path having the highest path evaluation value among the plural paths is selected so as to determine a character segmentation position. When the path is selected, the character segmentation position is determined. Thus, characters may be segmented. Then, the character recognition results of the segmented characters (character images) are determined.

Figure 35:
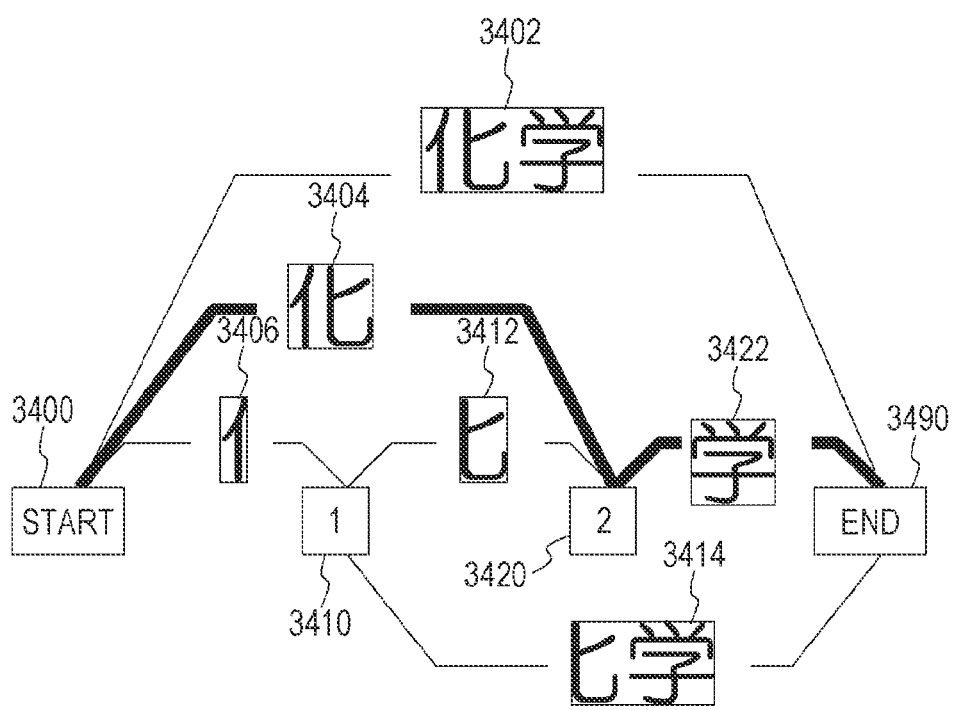
FIG. 35 is a diagram illustrating an example of a pattern in the network representation.

For example, in the example of FIG. 35, it is assumed that the path indicated by the thick line is selected. In this case, there are three character segmentation positions, namely, the start point 3400, the intermediate node 3420 (the node 2), and the end point 3490. Then, the determined character recognition results are "化" (the character segmentation pattern 3404) and "学" (the character segmentation pattern 3422).

The following described a method of calculating a path evaluation value. Generally, the path evaluation value is a weighted sum of arc evaluation values. A path evaluation value is given by the following equation (1):

$$P = \sum_{i=1}^{N} w_i V_i \qquad (1)$$

in which $V_i$ is the arc evaluation value of an i-th arc; $w_i$ is the weight with respect to the i-th arc evaluation value; N is the number of arcs; and P is the path evaluation value.

As mentioned above, there are plural paths. In actual character strings, there are many sub-characters, and therefore there are an enormous number of paths.

In the following, the Viterbi algorithm will be described, which is a dynamic programming algorithm appropriate for finding the most appropriate path in such a network.

Figure 36:
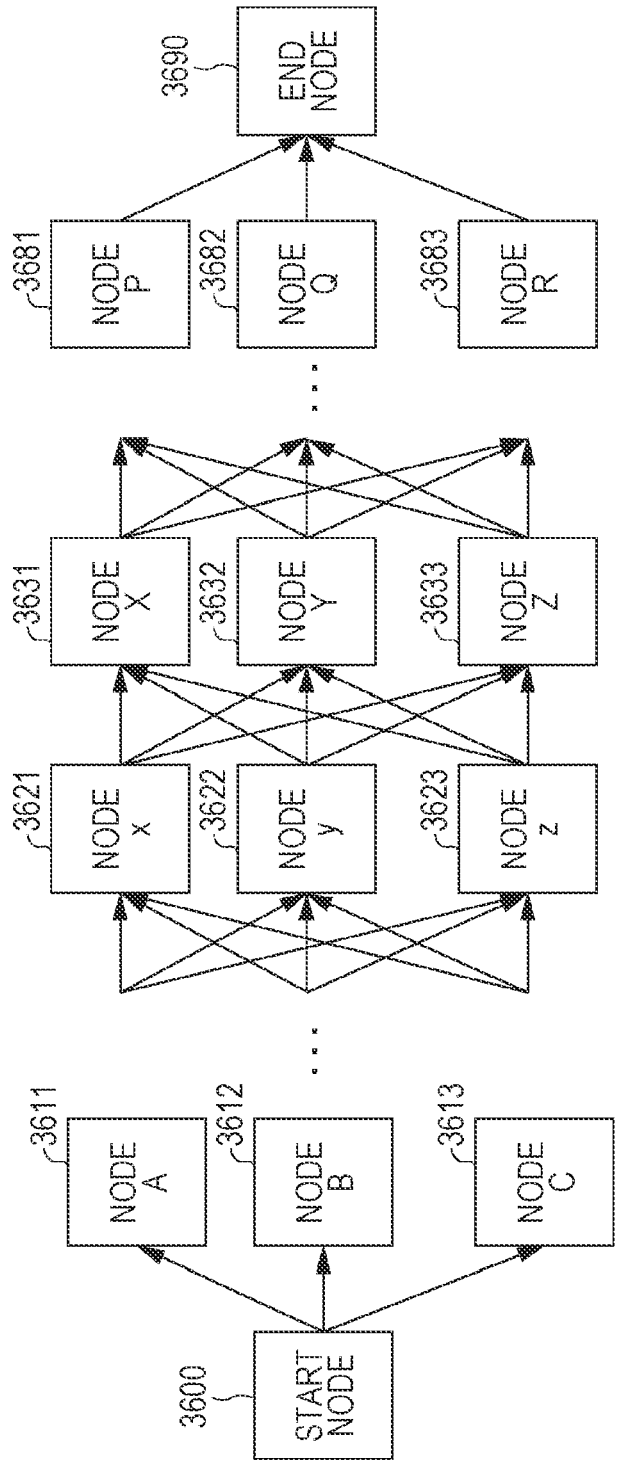
FIG. 36 is a diagram illustrating an example of a network.

In the example illustrated in FIG. 36, a network from a start node 3600 to an end node 3690 will be described. Note that links (also referred to as arcs) between nodes are not limited to those illustrated in FIG. 36, but may include various other links. It should be understood that the links are not limited to symmetric connections illustrated in FIG. 36.

In this network, there are plural nodes (intermediate nodes 3611, 3612, 3613, and so on) between the start node and the end node. These nodes in the middle are referred to as intermediate nodes.

There are links between the nodes. Each link is assigned a unique evaluation value (link value). There are plural paths leading from the start node 3600 to the end node 3690. Each path includes plural links. The sum of the link values of the links included in the path is the evaluation value of the path.

For example, the link value may be a distance between nodes. In this case, among the paths leading from the start node to the end node, the path having the lowest path evaluation value is the path having the shortest distance. Alternatively, the path having the highest path evaluation value may be obtained.

According to the Viterbi algorithm, one link is selected from links that are connected to a node from the same side, and paths other than the most appropriate path are eliminated. Thus, the processing load and the required memory space are reduced.

For example, it is assumed that one of links that are connected to a node x (an intermediate node 3621) from the left side is already selected. Similarly, one link is already selected for each of a node y (an intermediate node 3622) and a node z (an intermediate node 3623). Then, one of links that are connected to a node X (an intermediate node 3631) from the left side is selected. The node X (the intermediate node 3631) has links connected from three nodes, namely, the node x (the intermediate node 3621), the node y (the intermediate node 3622), and the node z (the intermediate node 3623). In this case, one of the links leading from the node x (the intermediate node 3621), the node y (the intermediate node 3622), and the node z (the intermediate node 3623) to the node X (the intermediate node 3631) may be the most appropriate as the path that passes through the node X (the intermediate node 3631). The most appropriate one is selected from these three, and the other two are eliminated. In this way, one of paths (links) that are connected to the node X (the intermediate node 3631) from the left is selected. Similarly, one of links that are connected from the left side is selected for each of a node Y (an intermediate node 3632) and a node Z (an intermediate node 3633).

This operation is performed in the order from a node A (an intermediate node 3611), a node B (an intermediate node 3612), and a node C (an intermediate node 3613) toward the right. Eventually, three paths connected to a node P (an intermediate node 3681), a node Q (an intermediate node 3682), and a node R (an intermediate node 3683) are selected. The most appropriate path may be selected from these three paths.

Similarly, the most appropriate path selection method using the Viterbi algorithm may be applied to the network illustrated in FIG. 34. Character segmentation positions are recognized as nodes. Further, the arc evaluation value may be the link value described above.

Figure 37:
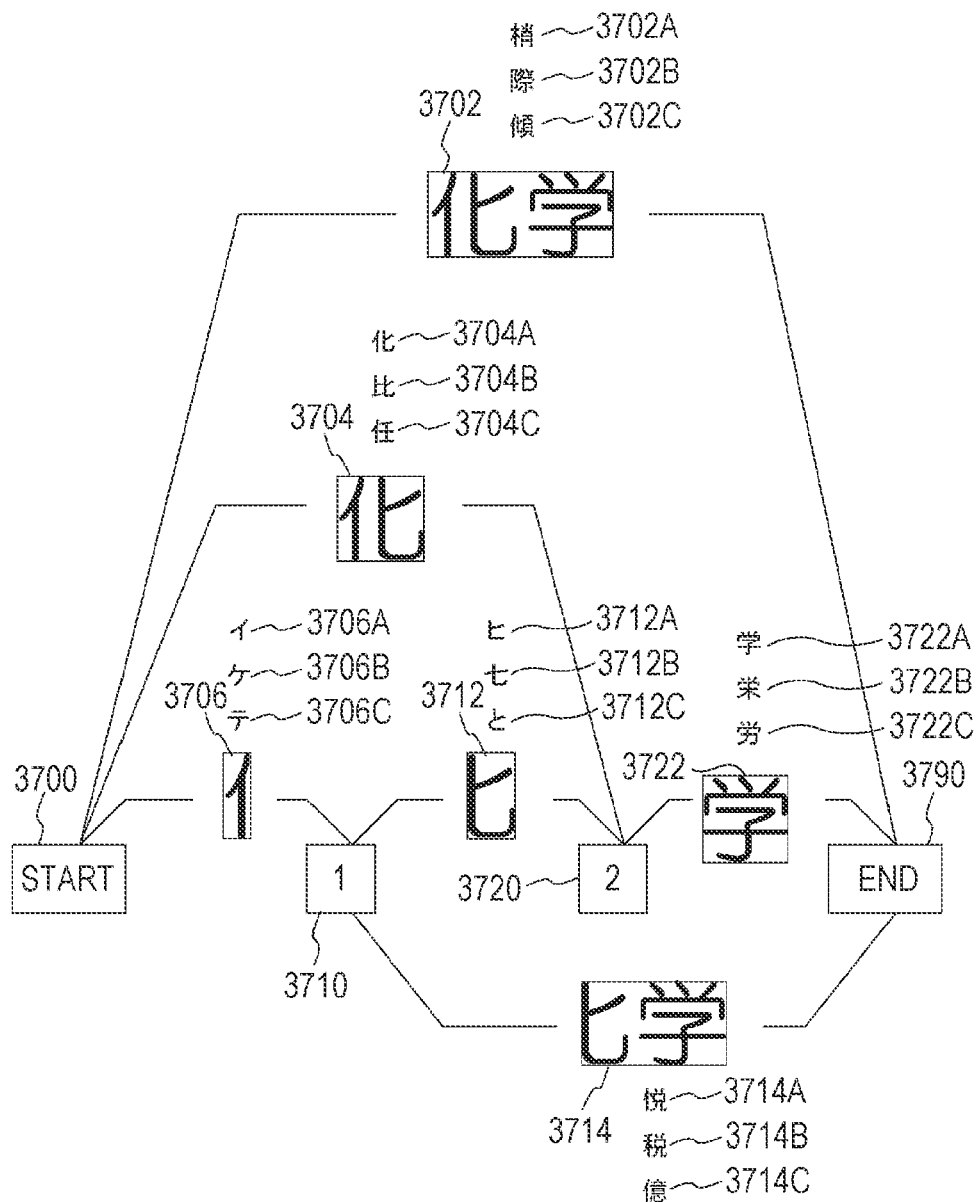
FIG. 37 is a diagram illustrating an example of a network in the case where there are plural candidate characters.

In a network handled by a related art technique, such as one illustrated in FIG. 34, a single candidate character is present on each arc. In reality, however, plural candidate characters are present on each arc. This is the case where there are plural character recognition results for a single sub-character. For example, as illustrated in FIG. 37, plural candidate characters are assigned. FIG. 37 is a diagram illustrating an example of a network in the case where there are plural candidate characters. In the example of FIG. 37, when an image " 化学 " (a character image 3702) is recognized as one character, there are three character recognition results, which are a candidate character 3702A " 悄 ", a candidate character 3702B " 際 ", and a candidate character 3702C " 傾 ". When an image " 化 " (a character image 3704) is recognized as one character, there are three character recognition results, which are a candidate character 3704A " 化 ", a candidate character 3704B " 比 ", and a candidate character 3704C " 比 ". Similarly, plural candidate characters are obtained as character recognition results for each of the other character images. In the example of FIG. 37, there are three candidate characters for each image character. However, the number of candidate characters may differ from character to character. For example, in the case of obtaining characters having a recognition accuracy higher than a predetermined value as candidate characters, the number of candidate characters may differ from character to character.

Hereinafter, an exemplary embodiment of the present invention will be described in detail with reference to the accompanying drawings.

Figure 1:
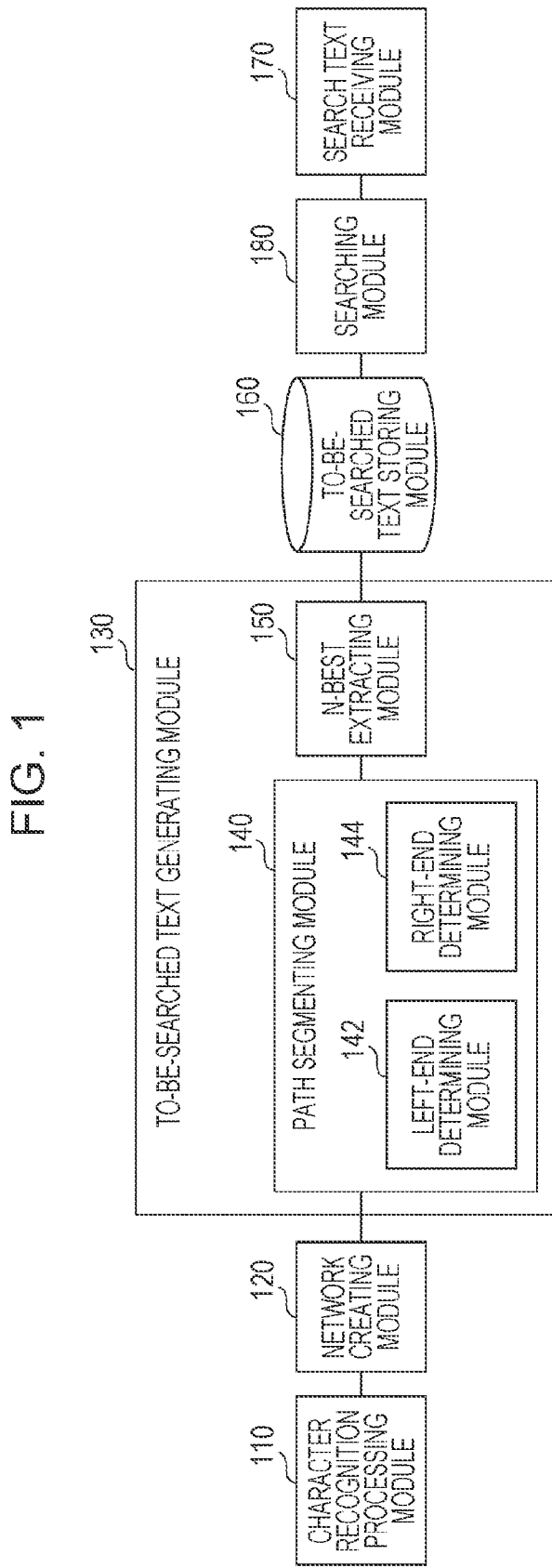
FIG. 1 is a conceptual module configuration diagram illustrating an example of the configuration according to an exemplary embodiment.

FIG. 1 is a conceptual module configuration diagram illustrating an exemplary configuration according to this exemplary embodiment.

Note that a module generally refers to a logically separable component, such as software (computer program) and hardware. Accordingly, the term "module" as used in this exemplary embodiment refers not only to a module in a computer program but also to a module in a hardware configuration. Therefore, the description of this exemplary embodiment serves as a description of a computer program for causing a computer to function as such modules (a program for causing a computer to execute respective procedures, a program for causing a computer to function as respective units, and a program for causing a computer to realize respective functions), a system, and a method. For the convenience of description, expressions "store" and "cause . . . to store", and expressions equivalent thereto will be used. These expressions specifically mean "cause a storage device to store" or "control a storage device to store" in the case where an exemplary embodiment is implemented as a computer program. Each module may have a one-to-one relationship with a function. In terms of packaging, a single module may be constituted by a single program, or plural modules may be constituted by a single program. Conversely, a single module may be constituted by plural programs. Also, plural modules may be executed by a single computer, or a single module may be executed by plural computers in a distributed or parallel environment. A single module may include another module. Furthermore, the term "connection" as used herein refers not only to physical connection but also to logical connection (such as relationship for exchanging data, exchanging instructions, and referring to data). The term "predetermined" refers to being determined prior to an operation of interest is performed. That is, this term has the meaning of being determined prior to an operation of interest, in accordance with a present situation or state or in accordance with a previous situation or state, before an operation of this exemplary embodiment is started, or even after an operation of this exemplary embodiment is started. If there are plural "predetermined values", these value may differ from each other, or two or more (or all) of these value may be equal to each other. The expression "if A, then B" is used to indicate that "determine whether A is true, and do B if A is true". However, this does not apply to the case where it is not necessary to determine whether A is true.

A system or an apparatus may be realized by plural computers, hardware units, devices, or the like that are connected to one another via a communication medium, such as a network (including communication connection having a one-to-one correspondence), or may be realized by a single computer, hardware unit, device, or the like. The terms "apparatus" and "system" are used synonymously. Of course, the "system" does not include mere social "mechanisms" (social systems) based on human arrangements.

Information to be processed is read from a storage device in individual processes performed by respective modules or in individual processes performed by a single module. After each process is performed, the processing results are written into the storage device. Accordingly, a description about reading from the storage device before the process and writing into the storage device after the process may be omitted. Examples of storage devices used herein may include a hard disk, a random access memory (RAM), an external storage medium, a storage device connected through a communication line, a register in a central processing unit (CPU), and the like.

The information processing apparatus of this exemplary embodiment recognizes a character from an image, generates an object of search (a to-be-searched object, hereinafter also referred to as a to-be-searched text), and performs a search. As illustrated in the example of FIG. 1, the information processing apparatus includes a character recognition processing module 110, a network creating module 120, a to-be-searched text generating module 130, a to-be-searched text storing module 160, a search text receiving module 170, and a searching module 180. The to-be-searched text generating module 130 includes a path segmenting module 140, and an N-best extracting module 150. The path segmenting module 140 includes a left-end determining module 142 and a right-end determining module 144. This information processing apparatus may be realized as a system in which an information processing apparatus A including the character recognition processing module 110, the network creating module 120, and the to-be-searched text generating module 130, an information processing apparatus B including the to-be-searched text storing module 160, and an information processing apparatus C including the search text receiving module 170 and the searching module 180 are connected to one another through a communication line, for example. Alternatively, the information processing apparatus B stores the processing results obtained by the information processing apparatus A, and then is disconnected from the information processing apparatus A so as to be connected to the information processing apparatus C via a communication line.

The character recognition processing module 110 is connected to the network creating module 120. The character recognition processing module 110 recognizes a character from an image, and transmits the character recognition results to the network creating module 120. The character recognition results contain at least plural character codes for each sub-character. The character recognition results may also contain other information such as the recognition accuracy of each character code, the position of the sub-character (for example, coordinates in an XY coordinate system in the image), and the size (for example, the width and height of the circumscribed rectangle of the sub-character). The process performed by the character recognition processing module 110 will be described in greater detail below with reference to the example of FIG. 4.

The network creating module 120 is connected to the character recognition processing module 110 and the path segmenting module 140. The network creating module 120 receives the character recognition results from the character recognition processing module 110, and creates a network in which respective characters of plural character recognition results are represented as nodes, and in which nodes of adjacent sub-characters are connected with a link. More specifically, the network creating module 120 generates the network described above.

The path segmenting module 140 is connected to the network creating module 120 and the N-best extracting module 150. The left-end determining module 142 determines a first candidate boundary in the network. The right-end determining module 144 determines a second candidate boundary different from the first candidate boundary in the network. A character string located between the first candidate boundary and the second candidate boundary is specified by the left-end determining module 142 and the right-end determining module 144.

The left-end determining module 142 may shift the first candidate boundary from the top to the end of the network. For example, in the case where the left-end determining module 142 selects every node from the top node to the end node in the network as the first candidate boundary without missing any node, it is possible to extract all the candidate character strings represented in the network.

The left-end determining module 142 may set the first candidate boundary to a position where the distance between character images in a character string containing a character image on the first candidate boundary is equal to or greater than a threshold. Thus, in the case where an image of interest is text with spaces therein as in text written in English (in the case where there is a space between words), each candidate character strings corresponds to a word.

The right-end determining module 144 may determine, as the second candidate boundary, a position located a predetermined number of nodes away from the first candidate boundary. In this exemplary embodiment, "a predetermined number of nodes" is a synonym for "a predetermined number of sub-characters". That is, the candidate character string has a predetermined number of sub-characters (for example, three sub-characters) counted from the first candidate boundary.

The right-end determining module 144 may determine, as the second candidate boundary, a position spaced apart by a predetermined distance from the character image on the first candidate boundary. In this exemplary embodiment, the "distance" is specified in the number of pixels, millimeters, or the like. The distance from the first candidate boundary may be calculated on the basis of the position or size in the character recognition results described above. The predetermined distance may be a length of a known word.

The right-end determining module 144 may determine, as the second candidate boundary, a position spaced apart by a distance based on the height of the character image on the first candidate boundary or a distance based on the height of a character string containing the character image on the first candidate boundary. The "distance based on the height" may be calculated by, for example, multiplying the height by a predetermined value. That is, the length of the candidate character string is determined in accordance with the size of the character (the height of the character).

The N-best extracting module 150 is connected to the path segmenting module 140 and the to-be-searched text storing module 160. The N-best extracting module 150 extracts, as to-be-searched objects, plural candidate character strings from a set of candidate character strings each formed of nodes between the first candidate boundary and the second candidate boundary. Then, the N-best extracting module 150 stores, as to-be-searched objects, the extracted candidate character strings in the to-be-searched text storing module 160. Note that the plural candidate character strings are hereinafter also referred to as N-bests.

Further, the N-best extracting module 150 may calculate an evaluation value of a set of candidate character strings each formed of nodes between the first candidate boundary and the second candidate boundary, and extracts plural candidate character strings on the basis of the evaluation value.

The to-be-searched text storing module 160 is connected to the N-best extracting module 150 and the searching module 180. The to-be-searched text storing module 160 stores, as to-be-searched objects, the candidate character strings extracted by the N-best extracting module 150.

The search text receiving module 170 is connected to the searching module 180. The search text receiving module 170 receives a search character string.

The searching module 180 is connected to the to-be-searched text storing module 160 and the search text receiving module 170. The searching module 180 searches for a search character string using the candidate character strings stored in the to-be-searched text storing module 160 (that is, the candidate character strings extracted by the N-best extracting module 150) as to-be-searched character strings.

The processes performed by the search text receiving module 170 and the searching module 180 will be described below with reference to FIGS. 26 through 28.

Figure 2:
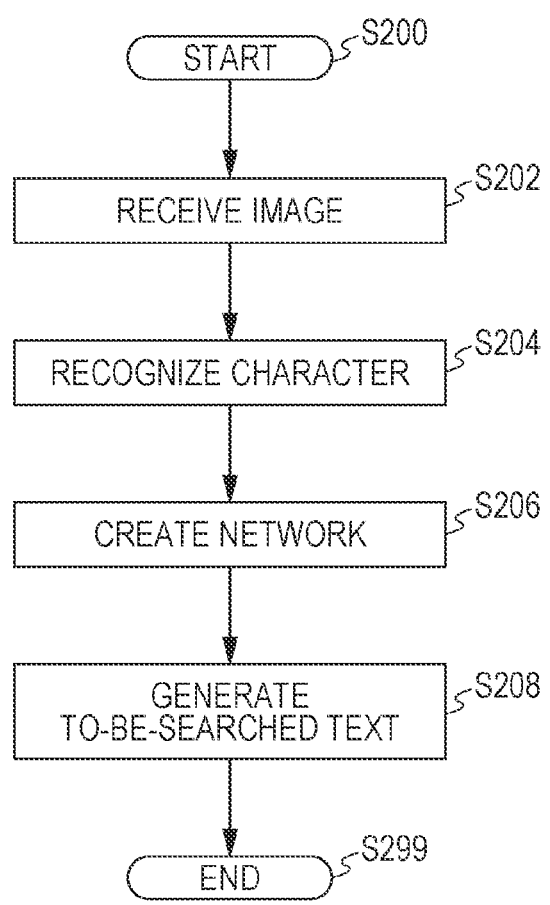
FIG. 2 is a flowchart illustrating an example of a to-be-searched text generation process according to the exemplary embodiment.

FIG. 2 is a flowchart illustrating an example of a to-be-searched text generation process according to this exemplary embodiment.

In step S202, the character recognition processing module 110 receives an image.

In step S204, the character recognition processing module 110 performs character recognition.

In step S206, the network creating module 120 creates a network on the basis of the character recognition results.

In step S208, the to-be-searched text generating module 130 generates a search text, and stores the search text in the to-be-searched text storing module 160.

Figure 3:
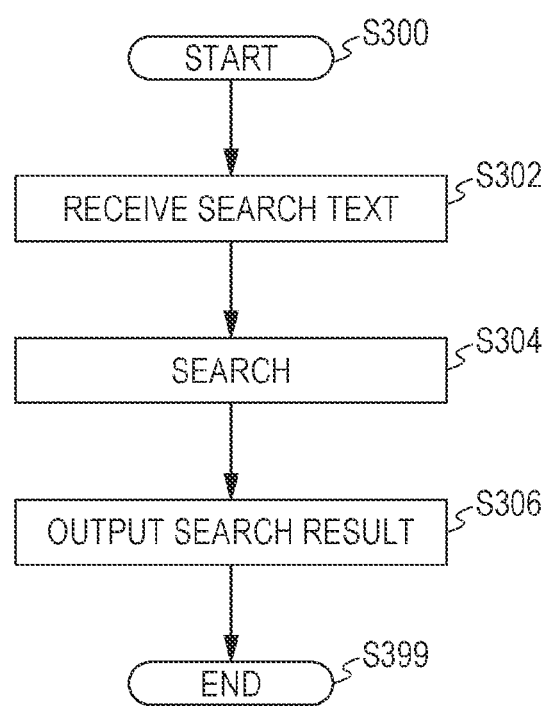
FIG. 3 is a flowchart illustrating an example of a search process according to the exemplary embodiment.

FIG. 3 is a flowchart illustrating an example of a search process according to this exemplary embodiment. In the case where there are plural undetermined character recognition results, a search is performed for such character recognition results. The undetermined character recognition result is a character recognition result that is not confirmed by a person. For example, a character recognition result is not determined when there is a sub-character that does not correspond to a character due to a character segmentation error, or when plural character recognition results are present for a single sub-character.

In step S302, the search text receiving module 170 receives a search text.

In step S304, the searching module 180 searches for a search text from plural to-be-searched texts stored in the to-be-searched text storing module 160.

In step S306, the searching module 180 outputs a search result.

Figure 4:
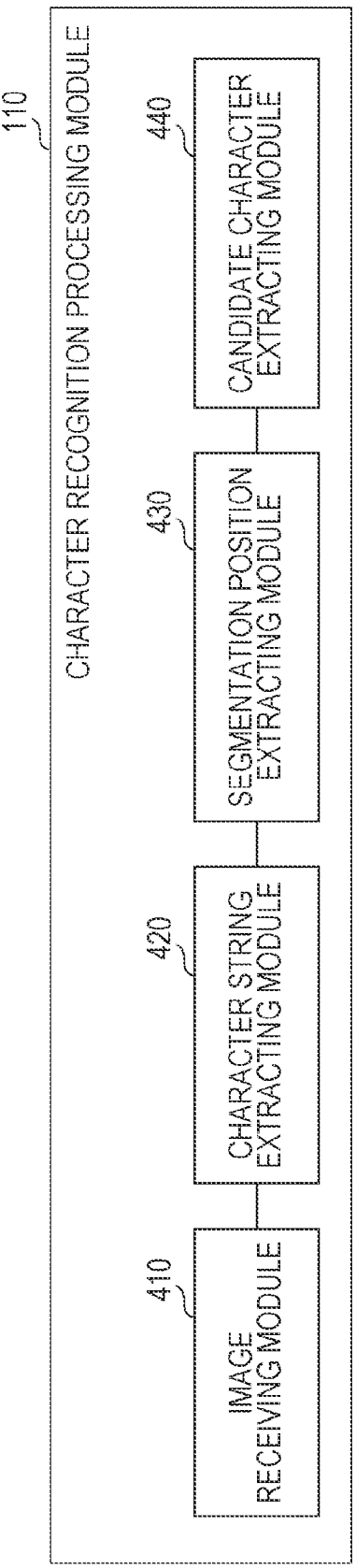
FIG. 4 is a conceptual module configuration diagram illustrating an example of the internal configuration of a character recognition processing module.

FIG. 4 is a conceptual module configuration diagram illustrating an example of the internal configuration of the character recognition processing module 110.

The character recognition processing module 110 includes an image receiving module 410, a character string extracting module 420, a segmentation position extracting module 430, and a candidate character extracting module 440.

The image receiving module 410 is connected to the character string extracting module 420. The image receiving module 410 receives an image, and transmits the image to the character string extracting module 420. Receiving an image includes, for example, reading an image from a scanner, a camera, or the like, receiving an image from an external device through a communication line by using a facsimile machine, and reading an image stored in a hard disk (which may be a hard disk of the computer, a hard disk connected through a communication line, or the like). The image may be a binary image or a multivalued image (including a color image). One or more images may be received. The image may be an image of a document used in business, a brochure for advertisement, or the like, as long as a character string is contained.

The character string extracting module 420 is connected to the image receiving module 410 and the segmentation position extracting module 430. The character string extracting module 420 extracts a character string from an image received by the image receiving module 410.

Images handled by the character string extracting module 420 are character string images representing a character string written in one line. The term "line" as used herein refers to a horizontal line in the case where texts are written horizontally, and is a vertical line in the case where texts are written vertically.

Accordingly, if the image received by the image receiving module 410 is a character string image representing a character string written in one line, the character string extracting module 420 uses the image without making any change. In some cases, the image receiving module 410 receives an image representing plural character strings. There have been various techniques proposed for separating plural character strings into individual character strings, these methods may be used. There are various methods of separating into individual character strings, and any of these methods may be used.

The segmentation position extracting module 430 is connected to the character string extracting module 420 and the candidate character extracting module 440. The segmentation position extracting module 430 extracts a segmentation position of a character image in the character string image extracted by the character string extracting module 420. That is, a character string image is divided into plural sub-characters. There are various methods of extracting a character segmentation position, and any of these methods may be used. In this exemplary embodiment, a character image is an image representing a candidate character. The character image does not have to be an image representing one character.

The segmentation position extracting module 430 may extract plural segmentation positions. When plural segmentation positions are extracted from one character string image, there are plural character segmentation position groups for the character string image. A character segmentation position group is one or more character segmentation positions with respect to one character string image. For example, if there are two character segmentation positions, the character string image is divided into three character images. Further, when there are plural character segmentation groups, there are plural character image strings, each segmented at character segmentation positions, with respect to one character string image. For example, there may be a character image string segmented at two character segmentation positions and thus including three character images, and a character image string segmented at four character segmentation positions and thus including five character images. More specifically, in the case of a character string image "化学", a character image string formed of "イ", "匕" and "学" and a character image string formed of "化" and "学" are generated.

The candidate character extracting module 440 is connected to the segmentation position extracting module 430. The candidate character extracting module 440 extracts plural candidate characters obtained as the character recognition results for character images segmented at positions extracted by the segmentation position extracting module 430, and transmits the candidate characters to the network creating module 120. For performing this extraction process, a character recognition process is performed. Therefore, the candidate character extracting module 440 includes a character recognizing module. As mentioned above, in the recognition results of the character recognition process, there are plural candidate characters for each character image. That is, when character recognition is performed on the character image, plural candidate characters, such as a candidate character having the highest recognition accuracy and a candidate character having the second highest recognition accuracy, are obtained as the character recognition results. The character recognition results may include not only the candidate characters, but also the recognition accuracy of the candidate characters. Further, a predetermined number of candidate characters may be extracted for each character image, or candidate characters having a recognition accuracy higher than a predetermined value may be extracted. Note that the recognition accuracy may be a value representing the reliability of the recognition result, or may be a value representing a similarity to a character defined by the size or aspect ratio of the circumscribed rectangle of a character image, or the like.

Figure 5:
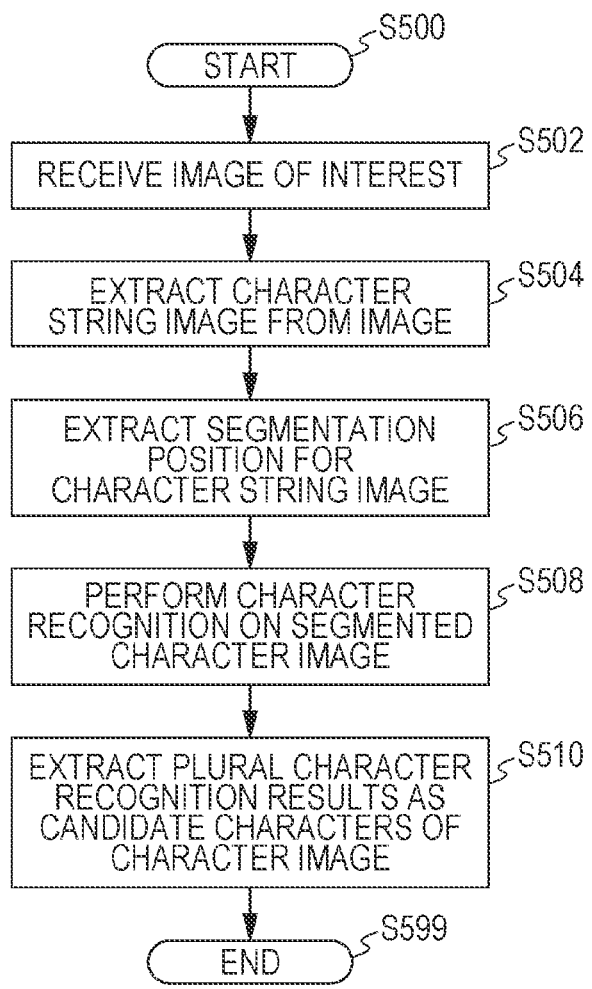
FIG. 5 is a flowchart illustrating an example of a process performed by the character recognition processing module.

FIG. 5 is a flowchart illustrating an example of a process performed by the character recognition processing module 110;

In step S502, the image receiving module 410 receives an image of interest.

In step S504, the character string extracting module 420 extracts a character string image from the image.

In step S506, the segmentation position extracting module 430 extracts segmentation positions for the character string image.

In step S508, the candidate character extracting module 440 performs character recognition on each segmented character image.

In step S510, the candidate character extracting module 440 extracts plural character recognition results as candidate characters of the character image.

Next, a process performed by the network creating module 120 will be described with reference to FIGS. 6 through 15.

In this exemplary embodiment, plural candidate character strings are extracted by outputting a path having a high path evaluation value. A dynamic programming algorithm may be used for finding a path.

A network of this exemplary embodiment includes a start node, an end node and plural intermediate nodes. Each link between the nodes is assigned a link value. A path leading from the start node to the end node through plural intermediate nodes passes through links in accordance with the nodes which the path passes through. A path value of the path leading from the start node to the end node may be represented as a weighted sum of the links through which the path passes.

The network creating module 120 of this exemplary embodiment generates the above-described nodes, links, and a path configuration (a network structure) when there are plural character recognition results. When a network structure is given, the network creating module 120 becomes able to find the most appropriate path using the Viterbi algorithm.

(A1. Case where the Character Segmentation Position is Fixed)

First, a description will be given of the case where the character segmentation position extracted by the segmentation position extracting module 430 is fixed (one type).

Figure 6:
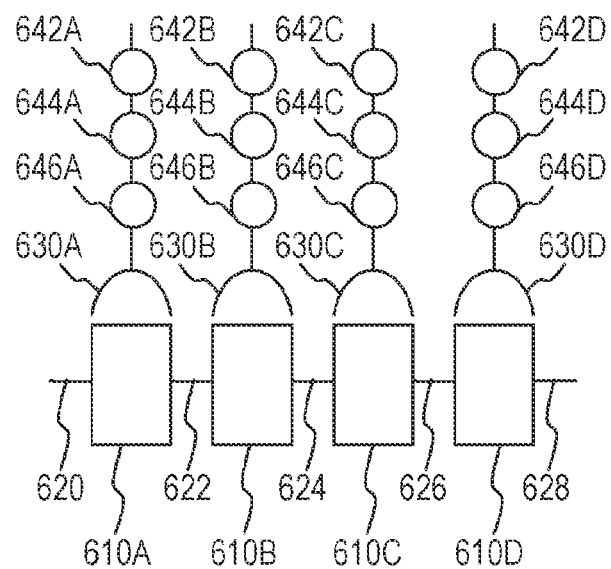
FIG. 6 is a diagram illustrating examples of symbols.
Figure 7:
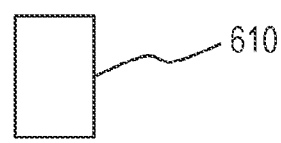
FIG. 7 is a diagram illustrating examples of symbols.

FIG. 6 is a diagram illustrating examples of symbols. The types of symbols include rectangles 610, horizontal lines representing connection lines 620, 622, 624, 626, and 628, curves 630, and circles representing candidate characters 642, 644, and 646.

In the example of FIG. 6, the rectangles 610A, 610B, 610C, and 610D (the rectangle 610 illustrated in FIG. 7) represent sub-characters.

Figure 8:
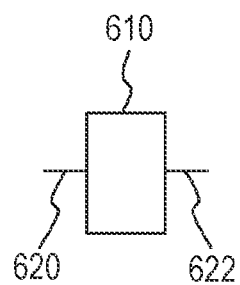
FIG. 8 is a diagram illustrating examples of symbols.

Also, the connection lines 620, 622, 624, 626, and 628 illustrated as horizontal lines represent character segmentation positions (the connection line 620 and the connection line 622 illustrated in FIG. 8). A sub-character is connected to an adjacent sub-character thorough a character segmentation position.

Further, the candidate characters 642A, 644A, 646A, 642B, 644B, 646B, 642C, 644C, 646C, 642D, 644D, 646D, etc. illustrated as circles represent plural candidate characters obtained when each sub-character is recognized as one character. Each of the curves 630A, 630B, 630C, and 630D indicate that character recognition is performed only on a sub-character thereunder.

Figure 9:
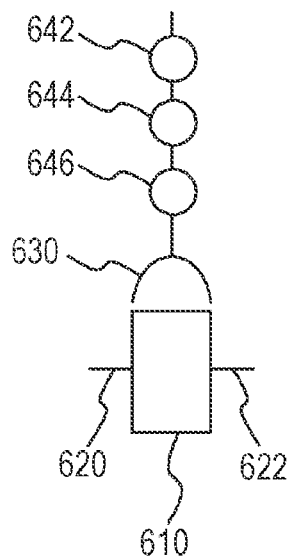
FIG. 9 is a diagram illustrating examples of symbols.

In the example of FIG. 9, candidate characters 642, 644, and 646 are plural candidate characters obtained when a sub-character indicated by the rectangle 610 thereunder is recognized. The curve 630 indicates that character recognition is performed only on the rectangle 610 thereunder.

Figure 10:
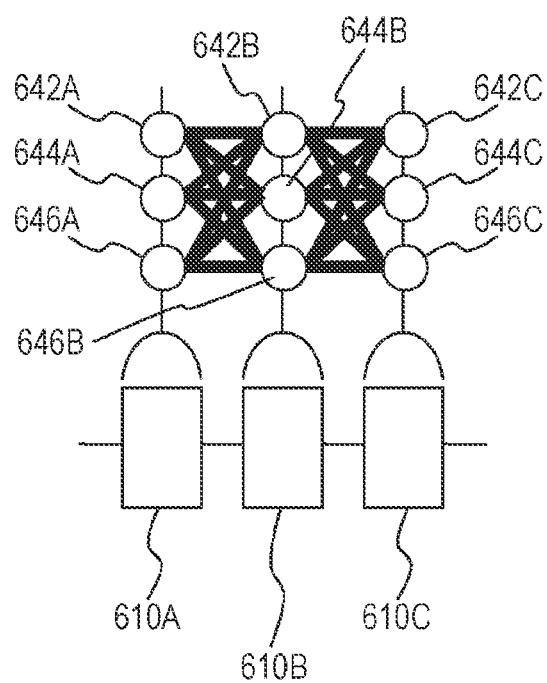
FIG. 10 is a diagram illustrating examples of symbols.

In this exemplary embodiment, plural candidate characters of a sub-character are considered as nodes. Further, each candidate character of the sub-character is connected to candidate characters of the adjacent sub-character with links. In the example of FIG. 10, the links are indicated by the thick lines.

As a link value generated by the link value generation process, a value that indicates the interaction between the nodes on the right and left of the link may be used. More specifically, the probability (bigram) that a candidate character on the left of a link and a candidate character on the right appear in succession in Japanese text may be used.

Nodes and links are formed in the way described above, so that the entire network structure is determined. Once the network structure is determined, it becomes possible to select the most appropriate path using the Viterbi algorithm or the like.

(A2. Case where Node Internal Information is Also Used)

In the above description, only the value indicating the interaction between nodes (the probability of appearance in a text) is used as a link value, an evaluation value of a single node may also be used. In this exemplary embodiment, the most appropriate path is found by using the Viterbi algorithm. A process of selecting one of the links that are connected to a node from the left of the node is performed in the order from the left.

It is assumed that, in the example of FIG. 10, a link is to be selected for each of the candidate characters 642B, 644B, and 646B in the current step.

In this case, link values of links between the candidate characters 642B, 644B, and 646B and candidate characters 642A, 644A, and 646A are generated. As a link value, both a value indicating the interaction between nodes, such as a bigram, and a value inside each node are used. For example, the value inside a node may be a character recognition accuracy of the candidate character 642B.

In this example, there are links between the candidate characters 642B, 644B, and 646B and the candidate characters 642A, 644A, and 646A. Therefore, evaluation values between the candidate characters 642B, 644B, and 646B and the candidate characters 642A, 644A, and 646A are easily calculated. On the other hand, the value inside a node is not present between the candidate characters 642B, 644B, 646B and the candidate characters 642A, 644A, and 646A, but is present in each of the candidate characters 642B, 644B, and 646B.

That is, node-to-node information is present inside a link, and node internal information is present at an end of a link. These values generated at different positions or generated on the basis of different concepts are treated together.

In this exemplary embodiment, a value inside a link (for example, a value of a bigram) and a value that is present only at one end of the link (for example, a character recognition accuracy of the candidate character 642B) are used as link evaluation values. A value that is present at the other end (for example, a character recognition accuracy of the candidate character 642A) is not used. In this way, it becomes possible to perform evaluation using both a value inside the link and a value at an end of the link.

Eventually, as an evaluation value (a path evaluation value) of a character string, the evaluation values of all the links are added in accordance with the equation (1) to obtain an evaluation value (a path evaluation value) of a character string. That is, if an evaluation value of a link contains an evaluation value inside the link and an evaluation value at an end of the link, then a path evaluation value contains evaluation values inside the respective links and evaluation values at respective ends of the links.

In the link value generation process, a link value may be calculated using, as the feature amount, plural values (bigram and recognition accuracy) such as a value inside a link and a value at an end of a link that are described above. As a method of calculating one link value on the basis of plural values in the manner described above, methods disclosed in (1) JP-A-9-185681, (2) JP-A-61-175878, (3) JP-A-3-37782, and (4) JP-A-11-203406 may be used. Methods other than these methods may also be used.

Note that if plural values are recognized as a feature vector, then a link value may be given by a function that outputs a link evaluation value (a scalar value) for the feature vector.

(A3. Case where Two or More Nodes are Used as Link Information)

In the above description, a bigram is used as mutual information between nodes on the right and left of a link. In this case, information indicating the relationship between two nodes is used as link information.

In the case where the Viterbi algorithm is used, one link is already selected on the left side of the candidate characters 642A, 644A, and 646A represented as nodes, for example. In this case, it is possible to generate link information using information on two or more nodes.

For example, it is possible to use a trigram indicating the occurrence probability of three consecutive characters, in place of a bigram indicating the occurrence probability of two consecutive characters.

It is assumed that, in a link value generation process, a link value on the left side of the candidate characters 642B, 644B, and 646B represented as nodes is to be generated.

For example, a link value between the candidate character 642A and the candidate character 642B is calculated. In the case of a bigram, the occurrence probability that the candidate character 642A and the candidate character 642B appear in succession may be obtained. The following describes the case of obtaining a trigram. Since one link is selected on the left side of the candidate character 642A, the character on the left of the candidate character 642A is actually already determined. A node holding this character is a node G. As a trigram, the occurrence probability of three characters of the node G–a node (the candidate character 642A)–a node (the candidate character 642B) may be obtained.

The trigram obtained in the way described above may be generated as a link value between the node (the candidate character 642A) and the node (the candidate character 642B). Similarly, it is possible to obtain an N-gram.

(A4. Case where a Character Segmentation Position is not Determined)

In the case where a character segmentation position is not determined (that is, in the case where plural character segmentation positions are extracted by the segmentation position extracting module 430, such as the case where it is not determined whether "化" is divided into two characters "イ" and "ヒ" or is one character "化"), a candidate character and a character segmentation position may be selected. In the case where a character segmentation position is not determined, selecting a candidate character is selecting a character segmentation position.

Figure 11:
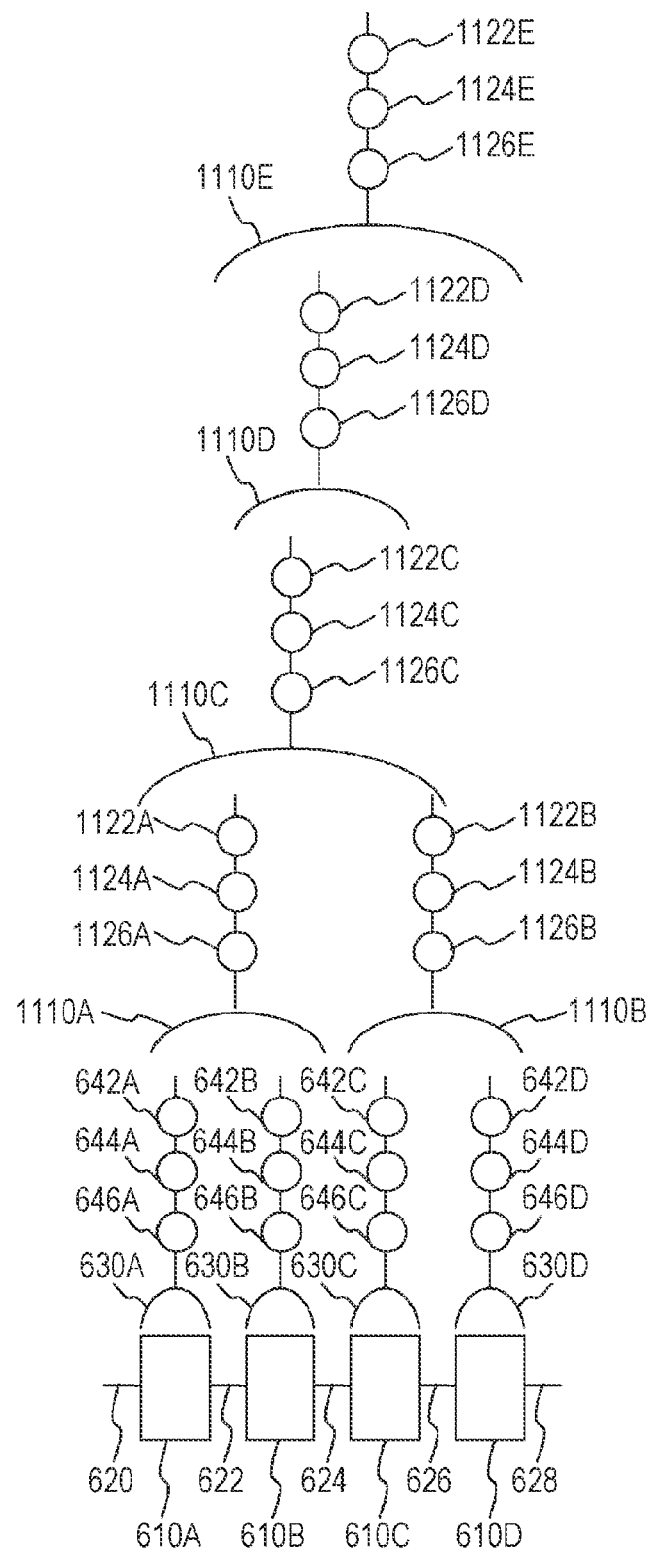
FIG. 11 is a diagram illustrating an example of a process performed in the case where there are plural character segmentation positions.

FIG. 11 is a diagram illustrating an example of a process performed in the case where there are plural character segmentation positions. In this example, the meaning of the symbol of the curve is added. In the case where the curve points to plural sub-characters (rectangles) thereunder, the curve indicates that an image of the plural sub-characters combined together is recognized as one character. A curve 1110A recognizes an image of a rectangle 610A and a rectangle 610B combined together as one character, and has candidate characters 1122A, 1124A, and 1126A as the character recognition results. A curve 1110C recognizes an image of the rectangles 610A, 610B, 610C, and 610D combined together as one character, and has candidate characters 1122C, 1124C, and 1126C as the character recognition results.

Figure 12:
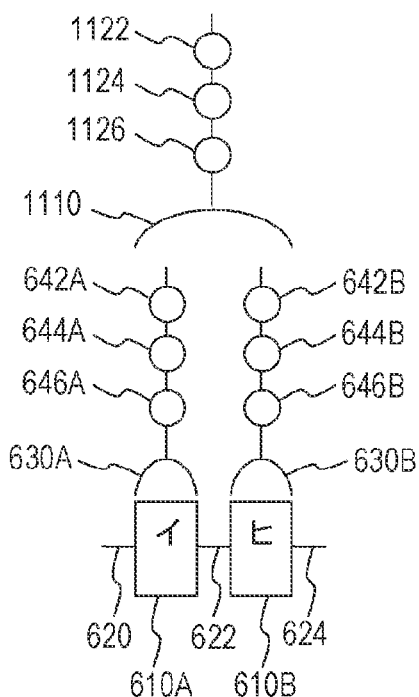
FIG. 12 is a diagram illustrating examples of symbols.

As illustrated in the example of FIG. 12, in the case where there are two sub-characters (the rectangle 610A and the rectangle 610B) under the curve 630A and the curve 630B, candidate characters (candidate characters 1122, 1124, and 1126) over a curve 1110 over these two correspond to candidate characters obtained upon recognizing a sub-character "化" which is obtained by combining "イ" and "ヒ".

Figure 13:
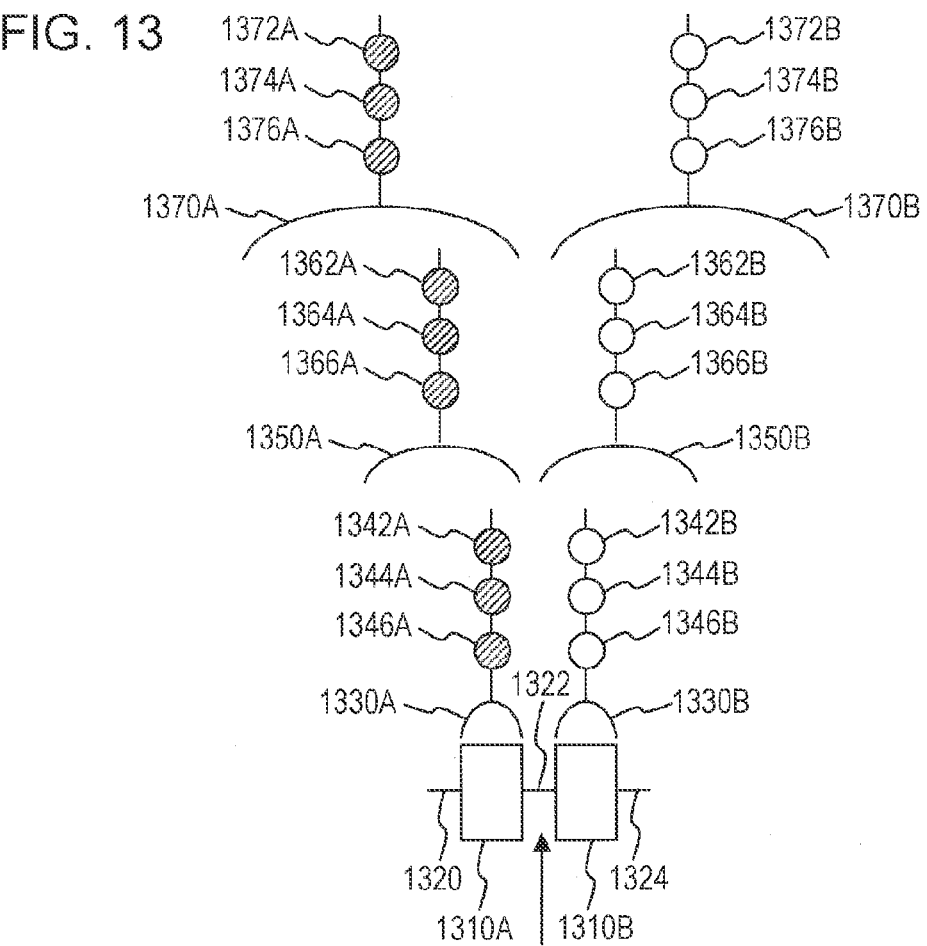
FIG. 13 is a diagram illustrating an example of a process performed in the case where there are plural character segmentation positions.

In the case where a character segmentation position is not determined, a link is connected as illustrated in the example of FIG. 13. FIG. 13 is a diagram illustrating an example of a process performed in the case where there are plural character segmentation positions.

In this example, attention is focused on character segmentation positions. Now, a description will be given of a link of nodes connected through a character segmentation position indicated by the arrow in FIG. 13. Nodes linked at this character segmentation position include two types of nodes:

(1) left nodes: nodes under curves whose right sides are located in the character segmentation position indicated by the arrow (nodes indicated by hatching, namely, candidate characters 1342A, 1344A, 1362A, 1364A, 1372A, 1374A, and so on); and (2) right nodes: nodes under curves whose left sides are located in the character segmentation position indicated by the arrow (nodes in white, namely, candidate characters 1342B, 1344B, 1362B, 1364B, 1372B, 1374B, and so on).

In this case, a graph structure may be created by forming links between the left nodes and the right nodes.

For example, links may be formed such that each of the left nodes is directly connected to all the right nodes. Further, in all the character segmentation positions, links are formed between left nodes and right nodes in the manner described above. In the case where the left side of nodes is the end of a character string, the nodes are connected to a start node. In the case where the right side of nodes is the end of a character string, the nodes are connected to an end node. Thus, the entire graph structure is created.

In this case, as a link value, a value that indicates the interaction between the nodes on the right and left of the link may be used, or an evaluation value inside the node may be used.

In this case, in particular, since a character segmentation position is not determined, character shape information may be used as an evaluation value inside the node. Examples of character shape information may include the aspect ratio of the character, and the blank space on the right and left of the character.

In this way, it is possible to draw all the paths leading from the left end of the character string to the right end of the character string. Each path corresponds to a recognition output character string. That is, in a network forming a character string, a character string may be determined by determining a path leading from the left end node to the right end node.

Figure 14:
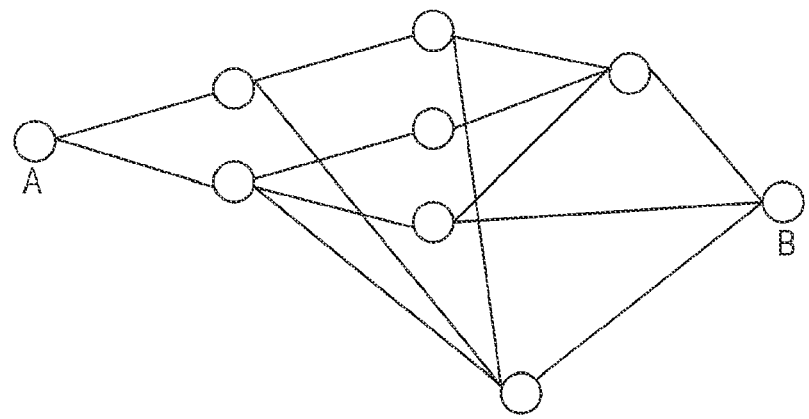
FIG. 14 is a diagram illustrating an example of a network forming a character string.

Accordingly, a network forming a character string may be illustrated as in FIG. 14, for example. In the example of FIG. 14, a white circle indicates a node. A solid line connecting white circles is an arc indicating connection between nodes or a link. A node A indicates the left end of a character string, and a node B indicates the right end the character string. In this network, a character string may be determined by determining a path leading from the left end node A to the right end node B.

Figure 15:
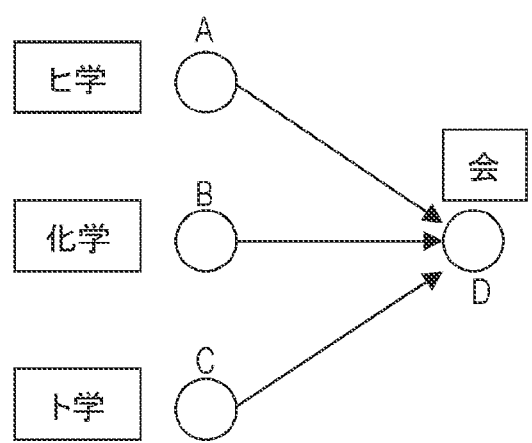
FIG. 15 is a diagram illustrating examples of nodes connected in a network forming a character string.

A description will be given of the example of FIG. 15. FIG. 15 is a diagram illustrating examples of nodes connected in a network forming a character string.

For example, it is assumed that three links are connected to a node D (a candidate character "会") from the left. These links are connected from a node A (a candidate character string "ヒ学"), a node B (a candidate character string "化学"), and a node C (a candidate character string "ト学"), respectively.

Although there are nodes connected to the nodes A, B, and C from the left, a description thereof will be omitted. The candidate character string of the node A is "ヒ学". The candidate character string of the node B is "化学". The candidate character string of the node C is "ト学".

Now, a description will be given of links connected to the node D from the left. In the case of a path from the node A, the candidate character string is "ヒ学会". In the case of a path from the node B, the candidate character string is "化学会". In the case of a path from the node C, the candidate character string is "ト学会". The to-be-searched text generating module 130 may extract a candidate character string as a to-be-searched object from plural paths leading from the left end to the right end.

Next, a description will be given of a process performed by the to-be-searched text generating module 130.

The process is performed on plural paths leading from the start point located at the left end of a character string image to the end point located at the right end of the character string image. There may be plural candidates for one sub-character. In this case, the process is performed on plural paths including these plural candidates. As mentioned above, an evaluation value may be given to each path leading from the start point to the end point. N character recognition outputs (candidate characters) are obtained from the paths in descending order of evaluation value. These N character recognition results are referred to as N-bests.

In general, a to-be-searched text is long. Therefore, if N-bests are obtained for a text that includes the entire part from the top to the end of the to-be-searched text, the likelihood of obtaining a character string that matches a search term is low.

For example, the case of 2-bests will be described. A first-ranked character string is "EEGHIJKL<MOPQR". A second-ranked character string is "EEGHIJKL<MOPQP", which differs from the first-ranked character string in only one character, for example. More specifically, the character "R" at the end is replaced with "P". It is assumed that the correct character string is "EFGHIJKL<MOPQP". That is, in the case where the recognition accuracy of "P" is higher than the recognition accuracy of the second recognized character "F", this second-ranked character string is obtained. In this case, if a search is performed using a search term "EFG", the search term is not present in the 2-bests ("EEGHIJKL<MOPQR" and "EEGHIJKL<MOPQP"). As a result, no match is found.

On the other hand, the to-be-searched text generating module 130 extracts N-bests as partial character strings. For example, 2-bets are generated as character strings each formed of three characters. Then, in the example described above, a second-ranked character string of the three characters from the top is "EFG", and thus is found as a match for the search term "EFG". That is, N-bests are not generated with respect to a path leading from the start point to the end point, but are generated with respect to a character string shorter than the path. In an extreme case, N-bests are generated for each single character. In this case, if a search term is a word, no match is found. That is, N-bests may be extracted for a character string formed of two or more characters but less than the number of characters contained in the path leading from the start point to the end point in the entire network.

Then, as a result of extraction of the extracted N-bests, a text code generated by connecting the plural results may be output as a character recognition result. By searching for this text code, if any of the N-bests is found as a match, it is possible to retrieve a document. That is, in addition to a first candidate for the entire text, N-bests of a partial character string of the text is added to a character recognition result file, and thereby a text file for search is generated.

FIG. 16 is a flowchart illustrating an example of a process performed by the to-be-searched text generating module 130.

In step S1602, the left-end determining module 142 determines an N-best left end position. A left end of a character string for extracting N-bests is referred to as an "N-best left end", and a right end of a character string for extracting N-bests is referred to as an "N-best right end".

In step S1604, the path segmenting module 140 determines whether a character string of the character recognition results ends. If the character string ends, the process ends (step S1699). If not, the process proceeds to step S1606.

In step S1606, the right-end determining module 144 determines an N-best right end position.

In step S1608, the N-best extracting module 150 extracts N-bests each formed of characters from an N-best left position to an N-best right end position.

In step S1610, the N-best extracting module 150 stores the extracted N-bests in the to-be-searched text storing module 160.

Figure 17A:
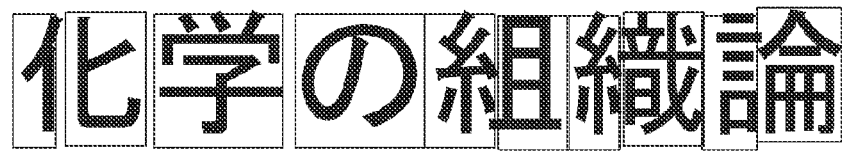
FIGS. 17A and 17B illustrate an example of a process according to the exemplary embodiment.
Figure 17B:

FIGS. 17A and 17B illustrate an example of a process according to this exemplary embodiment.

A sub-character is a character segmented at a candidate character boundary, or a part of a character. With regard to a sub-character, in terms of pixels, a cluster of a connected region may correspond to one sub-character, or plural connected regions together may correspond to one sub-character. Alternatively, even a connected region may be divided into plural sub-characters in the case where a connected portion is narrow.

Rectangles illustrated in the example of FIG. 17A are circumscribed rectangles of sub-characters.

In the following description, it is assumed that one rectangle is recognized as one sub-character, as illustrated in the example of FIG. 17B.

For example, in the case of a character string "化学", "イ" (the left component of "化"), "ヒ" (the right component of "化"), and "学" are accommodated in respective rectangles.

Figure 18A:
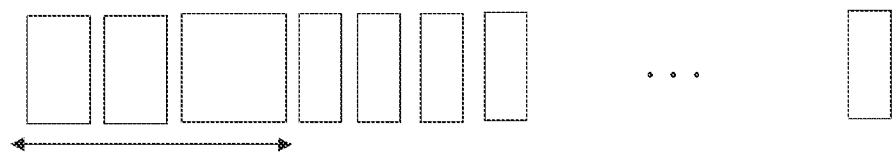
FIGS. 18A through 18C illustrate an example of a process according to the exemplary embodiment.
Figure 18B:
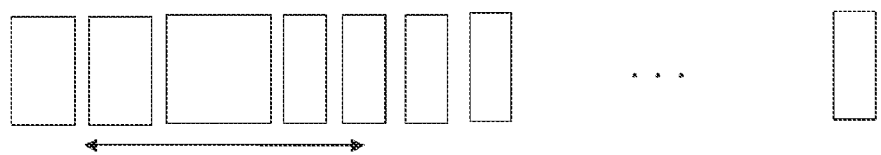
Figure 18C:
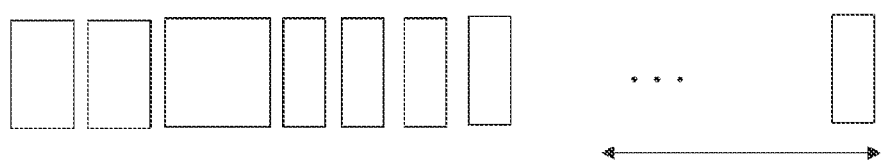

FIGS. 18A through 18C illustrate an example of a process according to this exemplary embodiment.

In this exemplary embodiment, for example, each of candidate character boundaries is selected as the left end of a character string for extracting N-bests all the candidate character boundaries. Then, the right end of the character string for extracting N-bests may be defined by the number of characters (nodes) from the left end thereof.

FIGS. 18A through 18C illustrate an example in which the number of sub-characters is three. Note that, as mentioned above, the number of sub-characters may be less than or greater than three. The number of sub-characters may be two or greater but less than the number of all the sub-characters contained from the start point to the end point in the entire network.

First, the N-best left end is set to the left end of the image of interest (step S1602). The N-best right end is set to a position three characters away in the right direction from the N-best left end (step S1606).

N-bests are selected from paths starting at the N-best left end and ending at the N-best right end. The selected N-bests (N character strings) are extracted (step S1608, FIG. 18A).

Subsequently, the N-best left end is shifted rightward to the next sub-character (step S1602 in the second round), and the same operations are performed (FIG. 18B).

When the N-best right end reaches the end of the character string of interest (step S1604), the process ends (step S1699, FIG. 18C).

The N-best results obtained in this process are stored as a character recognition result file in the to-be-searched text storing module 160 (step S1610). Thus, it becomes possible to perform a search.

Figure 19:
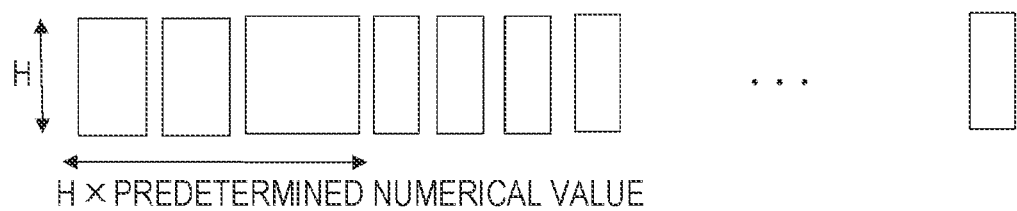
FIG. 19 illustrates an example of a process according to the exemplary embodiment.

FIG. 19 illustrates another exemplary process according to this exemplary embodiment.

The distance between the N-best left end and the N-best right end may not be limited to the number of sub-characters.

For example, the distance between the N-best left end and the N-best right end is determined as X=H×A, where H (pixel) is the height of a sub-character located at the N-best left end or the height of a character string containing the sub-character, and A is a predetermined numerical value (for example, 10 (pixels)).

The closest boundary position to the value X is set to the N-best right end. Alternatively, a boundary position that first exceeds the value X is set to the N-best right end.

In the above description, the height is measured in terms of "pixels". However, the height may be measured in terms of physical quantity such as "millimeters", in place of "pixels".

Further, the value X may be a value that is predetermined irrespective of H. That is, the N-best right end may be set to a position that is away from the N-best left end from the N-best left end by a predetermined distance (value X).

Figure 20A:
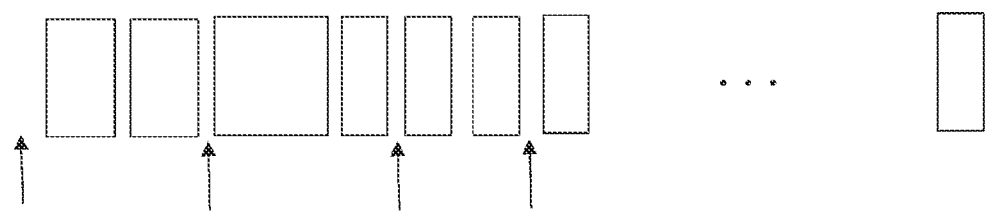
FIGS. 20A and 20B illustrate an example of a process according to the exemplary embodiment.
Figure 20B:
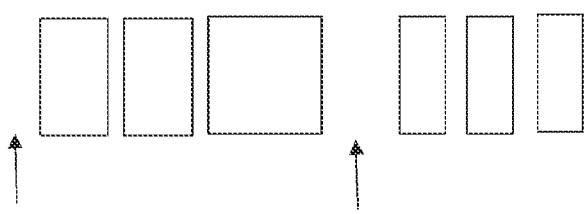

FIGS. 20A and 20B illustrate an example of a process according to this exemplary embodiment.

The N-best left end does not have to be set to each of the candidate character boundaries. For example, the N-best left end may be shifted to every predetermined number of candidate character boundaries, from the top to the end of the network. For example, as illustrated in FIG. 20A, the N-best left end may be shifted to every other candidate character boundary.

Further, the N-best left end may be set to a position where the distance between sub-characters is equal to or greater than a threshold. For example, as illustrated in FIG. 20B, the N-best left end is set to a position where sub-characters are spaced apart from each other. The threshold may be a predetermined value, or may be a statistical value (for example, mean, mode, median, a value obtained by multiplying any of these values by a constant, or the like) of the distance between sub-characters in the character string.

Figure 21:
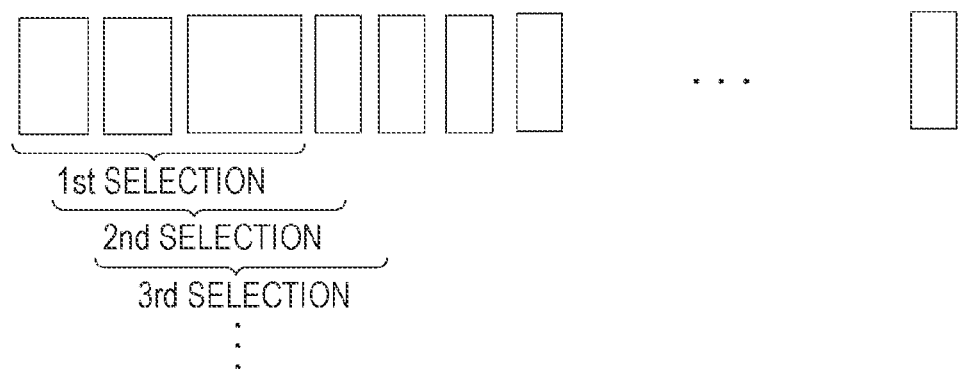
FIG. 21 illustrates an example of a process according to the exemplary embodiment.

FIG. 21 illustrates an example of a process according to this exemplary embodiment. Determining the N-best left end and the N-best right end is equivalent to selecting consecutive sub-characters. That is, there is no difference in principle between "selecting consecutive sub-characters" and "selecting an N-best left end and an N-best right end".

For example, as illustrated in FIG. 21, if the number of sub-characters is three, three consecutive characters may be selected. Selection may be made in the order from the left, or may be made randomly.

Figure 22A:
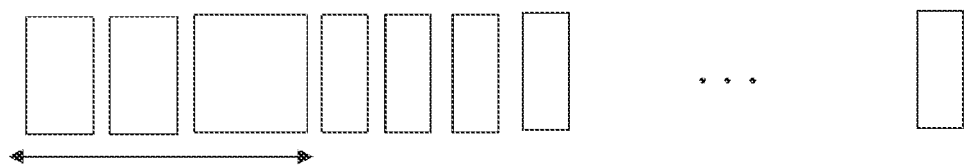
FIGS. 22A and 22B illustrate an example of a process according to the exemplary embodiment.
Figure 22B:
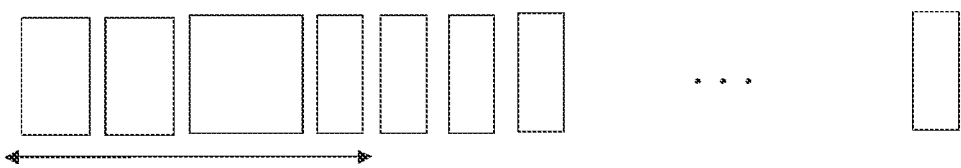

FIGS. 22A and 22B illustrate an example of a process according to this exemplary embodiment. As described above, the number of sub-characters for selecting the N-best right end may be fixed. Alternatively, the number of sub-characters may vary, in the case of a document in which there is a space between words, for example. In this case, the character string may be divided at the space.

Further, the number of sub-characters may be set to different values. For example, the number of sub-characters may be set to 3 and 4. Thus, when the N-best left end is fixed, two different N-best right ends may be extracted. N-bests of three characters may be extracted first as illustrated in the example of FIG. 22A, and then N-bests of four characters may be extracted as illustrated in FIG. 22B.

Figure 23A:
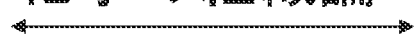
FIGS. 23A through 23C illustrate an example of a process according to the exemplary embodiment.
Figure 23B:
Figure 23C:

FIGS. 23A through 23C illustrate a more specific example of a process according to this exemplary embodiment.

The character recognition processing module 110 performs character recognition on the entire character string image. At this point, a character recognition error might occur. For example, as illustrated in FIG. 23A, in the case where character recognition is performed on a character string image "化学の組織論", a first candidate "イヒ学の組織論" in the character recognition results has a character recognition error due to a character segmentation error. Note that, in some of the second and following candidates, the portion "イヒ" is recognized as "化".

The to-be-searched text generating module 130 divides the character recognition result into parts so as to extract plural candidate character strings. There may be cases where a correct character string is present in the plural candidate character strings. For example, as illustrated in FIG. 23B, when character recognition is performed on a character string image having a predetermined length, the obtained results are "化学の" and "イヒ学の".

Then, the area from which plural candidate character strings are extracted is shifted so as to extract other plural candidate character strings. For example, as illustrated in FIG. 23C, when character recognition is performed on a character string starting at a position between the sub-character "イ" and the sub-character "ヒ" the obtained results are "ヒ学の" and "ヒ字の".

Figure 24:
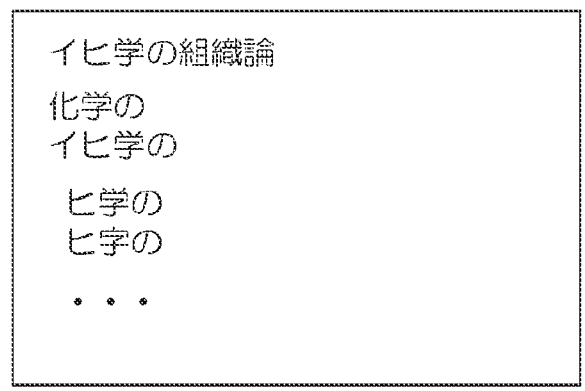
FIG. 24 illustrates an example of a process according to the exemplary embodiment.

As the final results, the recognition results illustrated in FIG. 24 are extracted, for example. Thus, although "化学" is not retrieved in the first candidate "イヒ学の組織論", it is possible to retrieve "化学" in the text file of the recognition results illustrated in FIG. 24.

Figure 25:
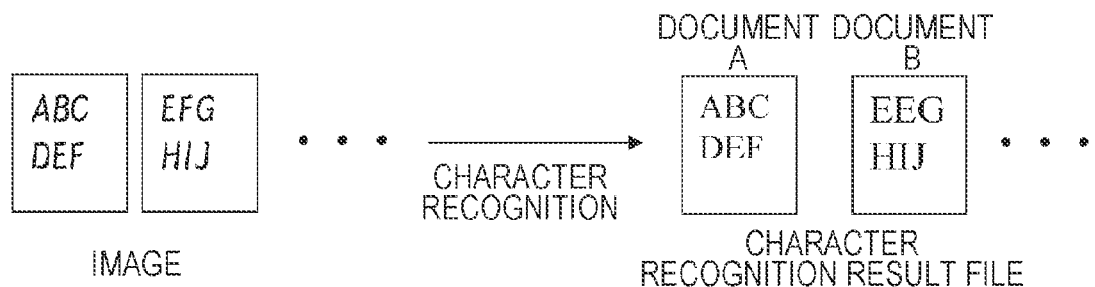
FIG. 25 illustrates an example of a process according to the exemplary embodiment.

FIG. 25 illustrates an example of a process according to this exemplary embodiment. For example, character recognition is performed on an image illustrated in the left of FIG. 25 so as to create a character recognition result file illustrated in the right of FIG. 25. As illustrated in the example of FIG. 24, this character recognition result file stores N-bests (plural candidate character strings) as the results of character recognition performed on a character string image between the N-best left end and the N-best right end.

Figure 26:
FIG. 26 illustrates an example of a process according to the exemplary embodiment.

The user enters a text code as a search term in a "search" window illustrated in the example of FIG. 26 so as to search for an image stored in a database or the like. Note that the substance as the search object is a character recognition result file corresponding to the image. That is, the image and the character recognition result file are stored in a database or the like. The image and the character recognition result file are linked to each other. Therefore, if the character recognition result file is retrieved, it is possible to retrieve the image file.

As illustrated in the example of FIG. 25, in the case where character recognition is correct, it is possible to retrieve a document A for a search term "ABC". In the case where character recognition is incorrect (in the case where a first candidate is "EEG" although the correct character string is "EFG"), if the character recognition result file only stores the first candidate, it is not possible to retrieve a document B when a search term "EFG" is entered. In this exemplary embodiment, a to-be-searched text is extended such that the character recognition result file of the document B stores, in addition to the first candidates "EEG" and "HIJ" as the character recognition results, second and following candidates "EFG", "H1J", and so on, each formed of three sub-characters, as the character recognition results. Therefore, it is possible to retrieve the document B.

Figure 27:
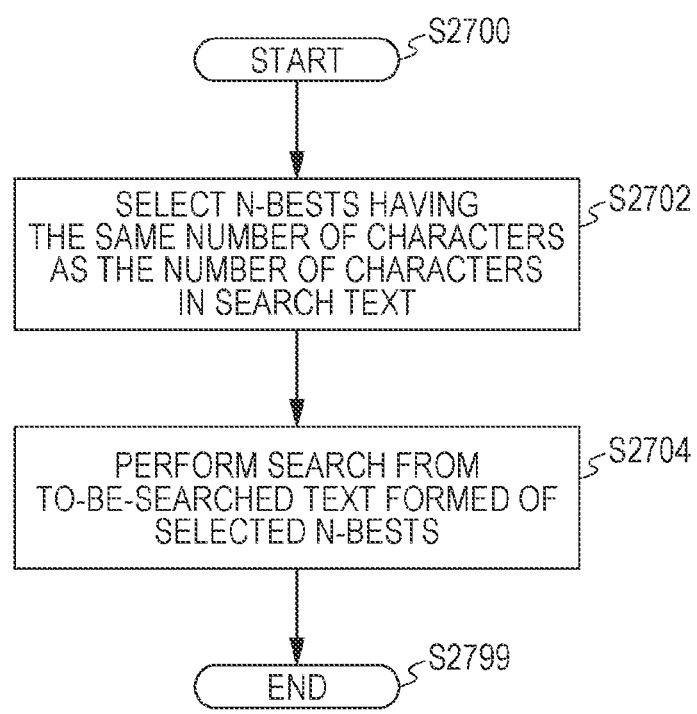
FIG. 27 is a flowchart illustrating an example of a process performed by a searching module.

FIG. 27 is a flowchart illustrating an example of a process performed by the searching module 180.

As step S304 of the flowchart illustrated in the example of FIG. 3, a process illustrated in the example of FIG. 27 may be performed.

In step S2702, the searching module 180 selects N-bests having the same number of characters as the number of characters in a search text. For example, in the case where N-bests having different number of characters are stored in the character recognition result file, N-bests having the same number of characters as the number of characters in the search text are selected.

In step S2704, the searching module 180 performs a search from a to-be-searched text formed of the selected N-bests.

Figure 28:
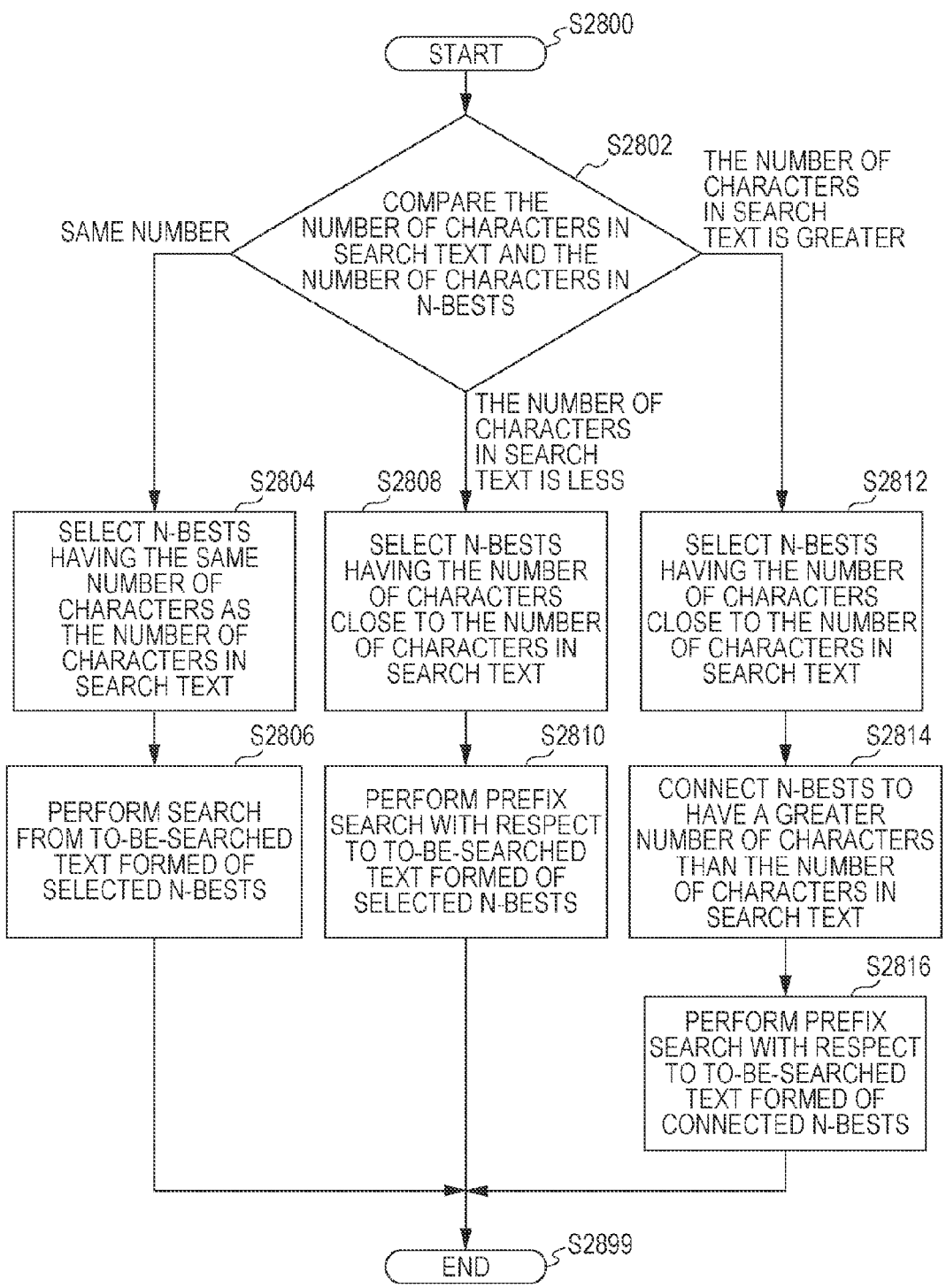
FIG. 28 is a flowchart illustrating an example of a process performed by the to-be-searched text generating module.

FIG. 28 is a flowchart illustrating an example of a process performed by the to-be-searched text generating module 130.

In step S2802, the number of characters in the search text and the number of characters in each N-best are compared. If there are N-bests having the same number of characters as the number of characters in the search text, the process proceeds to step S2804. If the number of characters in the search text is less, the process proceeds to step S2808. If the number of characters in the search text is greater, the process proceeds to step S2812.

In step S2804, the searching module 180 selects N-bests having the same number of characters as the number of characters in the search text.

In step S2806, the searching module 180 performs a search from a to-be-searched text formed of the selected N-bests.

In step S2808, N-bests having the number of characters close to the number of characters in the search text are selected.

In step S2810, a prefix search is performed with respect to a to-be-searched text formed of the selected N-bests.

In step S2812, N-bests having the number of characters close to the number of characters to the search text are selected.

In step S2814, the N-bests are connected so as to have a greater number of characters than the number of characters in the search text. This connection is made such that all the combinations of the N-bests of interest are generated.

In step S2816, a prefix search is performed with respect to a to-be-searched text formed of the connected N-bests.

Figure 29:
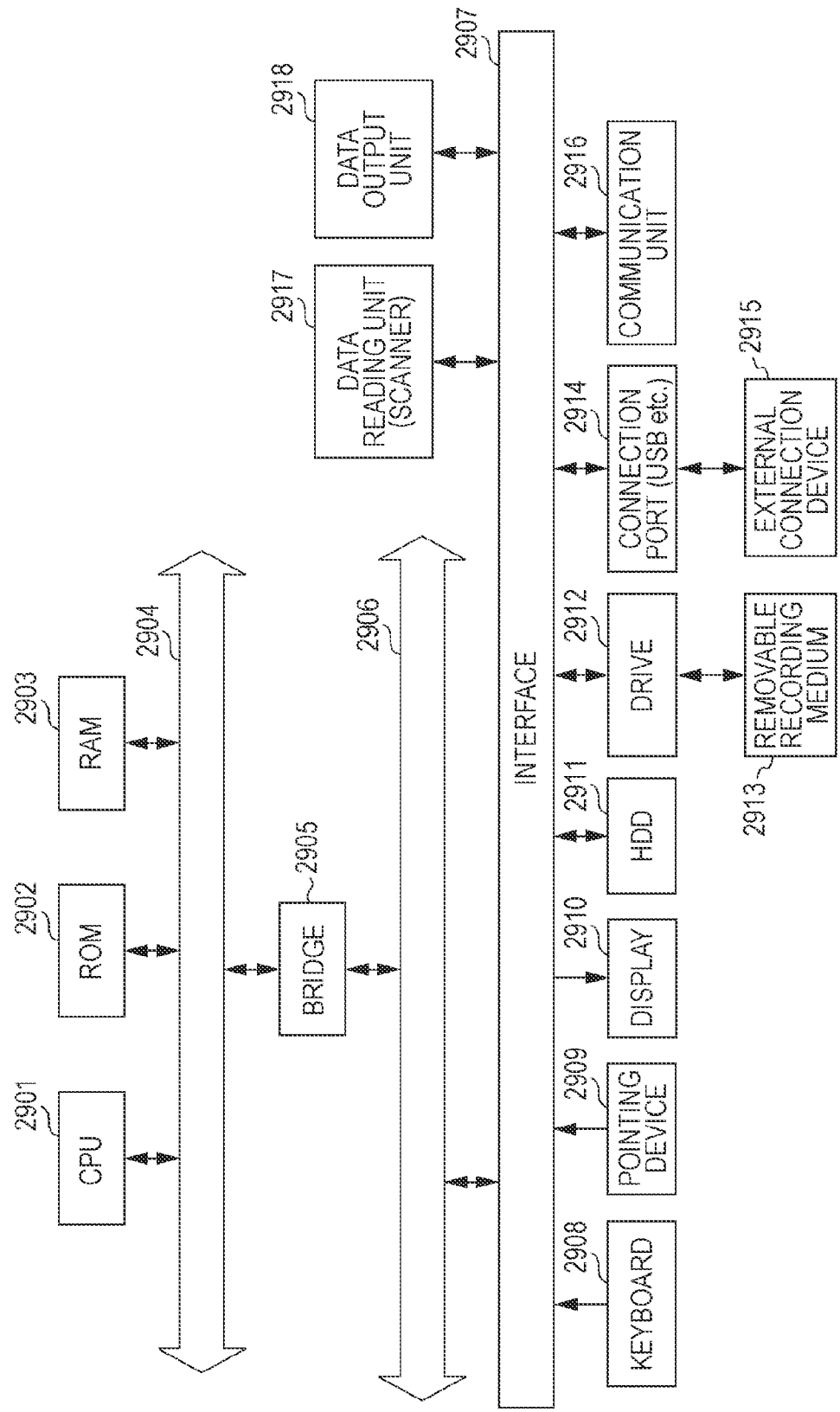
FIG. 29 is a block diagram illustrating an example of the hardware configuration of a computer that realizes the exemplary embodiment.

An example of the hardware configuration of an information processing apparatus of this exemplary embodiment will be described with reference to FIG. 29. The configuration illustrated in FIG. 29 is of a personal computer (PC) and the like. The illustrated example of the hardware configuration includes a data reading unit 2917 such as a scanner, and a data output unit 2918 such as a printer.

A central processing unit (CPU) 2901 is a controller that executes processing in accordance with a computer program describing an execution sequence of the individual modules described above in the exemplary embodiment, such as the character recognition processing module 110, the network creating module 120, the to-be-searched text generating module 130, the path segmenting module 140, the left-end determining module 142, the right-end determining module 144, the N-best extracting module 150, the search text receiving module 170, the searching module 180, the image receiving module 410, the character string extracting module 420, the segmentation position extracting module 430, and the candidate character extracting module 440.

A read only memory (ROM) 2902 stores programs, operation parameters, and the like, which are used by the CPU 2901. A random access memory (RAM) 2903 stores programs that are used by being executed by the CPU 2901 and parameters that are changed as necessary upon execution. These components are connected to one another by a host bus 2904 including a CPU bus or the like.

The host bus 2904 is connected to an external bus 2906 such as a peripheral component interconnect/interface (PCI) through a bridge 2905.

A keyboard 2908 and a pointing device 2909 such as a mouse are input devices which are operated by the operator. A display 2910 may be a liquid crystal display, a cathode ray tube (CRT), or the like, and displays various types of information as text or image information.

A hard disk drive (HDD) 2911 includes a hard disk. The HDD 2911 drives the hard disk so as to record or reproduce a program executed by the CPU 2901 and information. The hard disk stores a received image, character recognition results, a network structure, a target character string, a to-be-searched text, a search text, and the like. Furthermore, the hard disk stores various computer programs, such as various data processing programs.

A drive 2912 reads data or a program recorded on a removable recording medium 2913, such as a magnetic disk, an optical disc, a magneto-optical disc, or a semiconductor memory, loaded in the drive 2912, and provides the data or program to the RAM 2903 via an interface 2907, the external bus 2906, the bridge 2905, and the host bus 2904. The removable recording medium 2913 is usable as a data recording region similar to the hard disk.

A connection port 2914 is a port to which an external connection device 2915 is connected, and has a connection part for USB, IEEE 1394, and the like. The connection port 2914 is connected to the CPU 2901 and the like via the interface 2907, the external bus 2906, the bridge 2905, and the host bus 2904. A communication unit 2916 is connected to a communication line and executes data communication processing with the outside. The data reading unit 2917 is a scanner, for example, and reads a document. The data output unit 2918 is a printer, for example, and outputs document data.

The hardware configuration of the information processing apparatus illustrated in FIG. 29 is an example of the configuration. The hardware configuration of the information processing apparatus of this exemplary embodiment is not limited to the configuration illustrated in FIG. 29, and another configuration may be employed as long as the modules described in this exemplary embodiment may be executed therein. For example, some of the modules may be constituted by dedicated hardware (for example, application specific integrated circuit (ASIC) or the like), and some of the modules may be provided in an external system and may be connected via a communication line. Furthermore, plural apparatuses, each being the apparatus illustrated in FIG. 29, may be connected to one another via a communication line so as to operate in cooperation with one another. Alternatively, the apparatus illustrated in FIG. 29 may be incorporated into a copying machine, a facsimile machine, a scanner, a printer, or a multifunction apparatus (an image processing apparatus having two or more of a scanner function, a printer function, a copying function, a facsimile function, and the like).

In the above exemplary embodiment, Japanese characters are illustrated. However, this exemplary embodiment is applicable to other characters such as Chinese characters and English characters.

In the above exemplary embodiment, horizontal character strings starting at the left and ending at the right are illustrated. However, this exemplary embodiment is applicable to vertical character strings and horizontal character strings starting at the right and ending at the left. For example, in the case of vertical character strings, modification may be made such that "left" is changed to "top", and "right" is changed to "bottom". In the case of horizontal character strings starting at the right and ending at the left, modification may be made such that "left" is changed to "right", and "right" is changed to "left".

While the description has been made using equations, those equivalents to the equations may also be used. The equivalents include not only the equations used herein but also modification of the equation to the extent that the modification does not affect final results and solving the equation algorithmically.

The above-described program may be provided by being stored in a recording medium or via a communication medium. In that case, the above-described program may be recognized as a "computer readable recording medium having the program recorded thereon".

The "computer readable recording medium having the program recorded thereon" is a computer readable recording medium that has the program recorded thereon and that is used for installation, execution, or distribution of the program.

Examples of the recording medium include, for example, digital versatile discs (DVDs), such as a DVD-R, a DVD-RW, and a DVD-RAM which are based on the standard designed by the DVD forum, and such as a DVD+R and a DVD+RW which are based on the standard designed by DVD+RW. Also, examples of the recording medium include compact discs (CDs), such as a CD-ROM, a CD recordable (CD-R), and a CD rewritable (CD-RW). Furthermore, examples of the recording medium include a Blu-ray Disc (registered trademark), a magneto-optical (MO) disc, a flexible disk (FD), a magnetic tape, a hard disk, a read only memory (ROM), an electrically erasable and programmable ROM (EEPROM (registered trademark)), a flash memory, a random access memory (RAM), and a secure digital memory card (SD memory card).

The above-described program or part of the program may be recorded on the recording medium so as to be stored or distributed. Alternatively, the program or part of the program may be transmitted via a wired network, such as a local area network (LAN), a metropolitan area network (MAN), a wide area network (WAN), the Internet, an intranet, or an extranet, or via a wireless communication network. Furthermore, the program or part of the program may be transmitted using a transmission medium including a combination of the foregoing media, or may be transmitted using carrier waves.

Furthermore, the foregoing program may be part of another program, and may be recorded on a recording medium together with another program. Also, the program may be divided and recorded on plural recording media. The program may be recorded in any form, for example, a compressed form or an encrypted form, as long as the program may be decompressed or decrypted.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
at least one central processing unit (CPU) configured to:
create a network in which respective characters of a plurality of character recognition results are represented as nodes, and in which nodes of adjacent character images are connected with a link;
determine a first candidate boundary in the network;
determine a second candidate boundary different from the first candidate boundary in the network; and
extract, as to-be-searched objects, a plurality of candidate character strings from a set of candidate character strings each formed of nodes between the first candidate boundary and the second candidate boundary,
wherein the at least one central processing unit (CPU) determines, as the second candidate boundary, a position located a predetermined number of nodes away from the first candidate boundary.

2. The information processing apparatus according to claim 1, wherein the at least one central processing unit (CPU) shifts the first candidate boundary from a top to an end of the network.

3. The information processing apparatus according to claim 1, wherein the at least one central processing unit (CPU) sets the first candidate boundary to a position where a distance between character images in a character string containing a character image on the first candidate boundary is equal to or greater than a threshold.

4. The information processing apparatus according to claim 1, wherein the at least one central processing unit (CPU) determines, as the second candidate boundary, a position spaced apart by a predetermined distance from a character image on the first candidate boundary.

5. The information processing apparatus according to claim 1, wherein the at least one central processing unit (CPU) determines, as the second candidate boundary, a position spaced apart by a distance based on a height of a character image on the first candidate boundary or a distance based on a height of a character string containing the character image on the first candidate boundary.

6. The information processing apparatus according to claim 1, wherein the at least one central processing unit (CPU) calculates an evaluation value of a set of candidate character strings each formed of nodes between the first candidate boundary and the second candidate boundary, and extracts a plurality of candidate character strings on the basis of the evaluation value.

7. The information processing apparatus according to claim 1, wherein at least one central processing unit (CPU):
receives a search character string; and
searches for the search character string, using the candidate character strings extracted by the extracting unit as to-be-searched character strings.

8. An information processing method comprising:
creating a network in which respective characters of a plurality of character recognition results are represented as nodes, and in which nodes of adjacent character images are connected with a link;
first determining a first candidate boundary in the network;
second determining a second candidate boundary different from the first candidate boundary in the network; and
extracting, as to-be-searched objects, a plurality of candidate character strings from a set of candidate character strings each formed of nodes between the first candidate boundary and the second candidate boundary,
wherein a position located a predetermined number of nodes away from the first candidate boundary is determined as the second candidate boundary.

9. A non-transitory computer readable medium storing a program causing a computer to execute an information processing process, the process comprising:
creating a network in which respective characters of a plurality of character recognition results are represented as nodes, and in which nodes of adjacent character images are connected with a link;
first determining a first candidate boundary in the network;
second determining a second candidate boundary different from the first candidate boundary in the network; and
extracting, as to-be-searched objects, a plurality of candidate character strings from a set of candidate character strings each formed of nodes between the first candidate boundary and the second candidate boundary,
wherein a position located a predetermined number of nodes away from the first candidate boundary is determined as the second candidate boundary.

* * * * *